(12) United States Patent
Wen et al.

(10) Patent No.: US 10,659,342 B2
(45) Date of Patent: *May 19, 2020

(54) FLOW ENTRY CONFIGURATION METHOD, APPARATUS, AND SYSTEM

(71) Applicant: HUAWEI TECHNOLOGIES CO., LTD., Shenzhen, Guangdong (CN)

(72) Inventors: Bailin Wen, Hangzhou (CN); Fangping Liu, Santa Clara, CA (US); Weifeng Shen, Hangzhou (CN); Hongkuan Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,655

(22) Filed: Apr. 17, 2019

(65) Prior Publication Data

US 2019/0245772 A1  Aug. 8, 2019

Related U.S. Application Data

(63) Continuation of application No. 15/394,352, filed on Dec. 29, 2016, now Pat. No. 10,305,777, which is a continuation of application No. PCT/CN2014/089530, filed on Oct. 27, 2014.

(30) Foreign Application Priority Data

Jun. 30, 2014 (WO) ................ PCT/CN2014/081183

(51) Int. Cl.
*H04L 12/28* (2006.01)
*H04L 12/751* (2013.01)
(Continued)

(52) U.S. Cl.
CPC .............. *H04L 45/02* (2013.01); *H04L 45/38* (2013.01); *H04L 45/64* (2013.01); *H04L 45/306* (2013.01)

(58) Field of Classification Search
CPC ....... H04L 45/02; H04L 45/306; H04L 45/38; H04L 45/64
See application file for complete search history.

(56) References Cited

U.S. PATENT DOCUMENTS 7,730,517 B1  6/2010  Rey et al.
8,036,226 B1  10/2011  Ma et al.
(Continued)

FOREIGN PATENT DOCUMENTS

CN    102685006 A    9/2012
CN    102843299 A    12/2012
(Continued)

OTHER PUBLICATIONS

OpenFlow Switch Specification, Version 1.4.0 (Wire Protocol 0x05), Oct. 14, 2013. total 206 pages.
(Continued)

*Primary Examiner* — Phuc H Tran

(57) ABSTRACT

A flow entry configuration method, apparatus, and system are disclosed. The method includes: reporting, by a switch, information about a data packet of a first service to a controller, receiving a flow entry delivered by the controller according to the information and a flow table structure, determining a first target service path matching the flow entry of the first service, determining a target hardware flow table according to a preconfigured correspondence between the service path and a hardware flow table of the switch, and configuring a flow entry of the target hardware flow table according to the flow entry of the first service. Therefore, no matter to which controller the switch is connected, the switch can successfully configure, in the hardware flow table, the flow entry used to implement the first service, so as to successfully process the first service, thereby reducing a probability of failure in service processing.

20 Claims, 5 Drawing Sheets

(51) Int. Cl.
*H04L 12/721* (2013.01)
*H04L 12/715* (2013.01)
*H04L 12/725* (2013.01)

(56) References Cited

U.S. PATENT DOCUMENTS

| | | |
|---|---|---|
| 2010/0165983 A1 | 7/2010 | Aybay et al. |
| 2010/0325271 A1 | 12/2010 | Krzanowski et al. |
| 2011/0261723 A1 | 10/2011 | Yamato et al. |
| 2013/0223226 A1* | 8/2013 | Narayanan ............ H04L 45/308 370/236 |
| 2013/0279371 A1* | 10/2013 | Takashima ............. H04L 45/38 370/254 |
| 2014/0016648 A1 | 1/2014 | Hidaka et al. |
| 2014/0241356 A1* | 8/2014 | Zhang .................... H04L 45/38 370/392 |
| 2015/0081833 A1 | 3/2015 | Pettit et al. |
| 2015/0124815 A1 | 5/2015 | Beliveau et al. |
| 2015/0172174 A1 | 6/2015 | Kojima et al. |
| 2015/0304212 A1 | 10/2015 | Zhou |
| 2015/0372902 A1 | 12/2015 | Giorgetti et al. |
| 2016/0014036 A1 | 1/2016 | Oikawa et al. |
| 2016/0065427 A1 | 3/2016 | Shinohara |
| 2016/0127506 A1 | 5/2016 | Shinohara |
| 2016/0234097 A1* | 8/2016 | Chang ................ H04L 12/6418 |

FOREIGN PATENT DOCUMENTS

| | | |
|---|---|---|
| CN | 103152264 A | 6/2013 |
| CN | 103259718 A | 8/2013 |
| CN | 103428094 A | 12/2013 |
| CN | 103685033 A | 3/2014 |
| CN | 103703726 A | 4/2014 |
| CN | 103888368 A | 6/2014 |
| CN | 103888369 A | 6/2014 |
| EP | 2615781 A1 | 7/2013 |
| EP | 2690831 A1 | 1/2014 |
| JP | 2013183397 A | 9/2013 |
| RU | 2262209 C2 | 10/2005 |
| WO | 2012096131 A1 | 7/2012 |
| WO | 2012128282 A1 | 9/2012 |
| WO | 2013093857 A1 | 6/2013 |
| WO | 2013180207 A1 | 12/2013 |
| WO | 2014000290 A1 | 1/2014 |
| WO | 2014082056 A1 | 5/2014 |
| WO | 2014101777 A1 | 7/2014 |

OTHER PUBLICATIONS

OpenFlow Switch Specification, Version 1.3.0 (Wire Protocol 0x04) Jun. 25, 2012. total 106 pages.

OpenFlow Notifications Framework OpenFlow Management, Version 1.0, Oct. 15, 2013. total 18 pages.

* cited by examiner

FLOW ENTRY CONFIGURATION METHOD, APPARATUS, AND SYSTEM

CROSS-REFERENCE TO RELATED APPLICATIONS

This application is a continuation of U.S. patent application Ser. No. 15/394,352, filed on Dec. 29, 2016, which is a continuation of International Patent Application No. PCT/CN2014/089530, filed on Oct. 27, 2014. The International Patent Application claims priority to International Patent Application No. PCT/CN2014/081183, filed on Jun. 30, 2014. All of the aforementioned patent applications are hereby incorporated by reference in their entireties.

TECHNICAL FIELD

The present invention relates to the field of communication network technologies, and in particular, to a flow entry configuration method, apparatus, and system.

BACKGROUND

An OpenFlow network implements separation between a data forwarding layer and a control layer, and includes a controller at the control layer and a switch at the forwarding layer, where the controller controls the switch by using the OpenFlow protocol, so as to implement centralized control of the entire network. Specifically, the controller sends a flow entry to the switch by using the OpenFlow protocol, where the sent flow entry includes a match field value and an action value, where the match field value may be a destination MAC address, an Ethernet type, and the like, and the action value may be information used to indicate that a data packet is forwarded through a specified port; the switch adds the received flow entry to a hardware flow table, so as to search, when receiving a data packet later, the hardware flow table for a flow entry that matches the data packet, and to process the data packet according to an action value in the found flow entry.

In the prior art, the hardware flow table is configured by using the following method:

The switch stores a one-to-one correspondence between an OpenFlow flow table (for example, table T0, table T1, and table T2) and the hardware flow table (for example, access control list (ACL) 1 and ACL 2) of the switch, to generate a flow table structure, where the generated flow table structure includes a flow table type of each OpenFlow flow table and a match field and an action that are supported by each OpenFlow flow table; the switch reports the generated flow table structure to the controller, where the match field and the action that are supported by each OpenFlow flow table include a match field and an action of a corresponding hardware flow table.

The flow entry sent by the controller is generated according to processing logic of the controller and the flow table structure reported by the switch, where the processing logic of the controller is: generating a flow entry of a specific table for a specific service. For example, flow entries of table T0 and table T1 are generated for service A, and a flow entry of table T2 is generated for service B.

When receiving a flow entry, sent by the controller, of a flow table or some flow tables, the switch stores, according to the correspondence, the flow entry in the hardware flow table corresponding to the OpenFlow flow table. For example, when the flow entry of table T0 is received, the flow entry is stored in list ACL 1, so as to implement a service supported by the hardware flow table.

For example, match fields in_port (ingress port), eth_type (Ethernet type), src_mac (source MAC address), and dst_mac (destination MAC address), and an action output (forwarding through a port) are required to implement service A. List ACL 1 includes the first three match fields, and list ACL 2 includes the last two match fields and the output action, which indicate that list ACL 1 and list ACL 2 support service A. The switch stores a correspondence between table T0 and list ACL 1 and a correspondence between table T1 and list ACL 2; correspondingly, generated match fields of table T0 also include the first three match fields, generated table T1 includes the last two match fields and the output action, and then table T0 and table T1 support service A. The processing logic of the controller is generating the flow entries of table T0 and table T1 for service A; therefore, a flow entry used for processing a packet of service A is delivered to the switch.

Generally, different types of switches have different hardware forwarding chips, and hardware flow tables used by different hardware forwarding chips to support a same service are also different. For example, in ASIC chip 1, service A is supported by ACL 1 and ACL 2; in ASIC chip 2, service A is supported by ACL 3. However, when the controller generates a flow entry, if table T0 and table T1 reported by the switch based on ASIC chip 1 include a match field and an action needed by service A, the controller sends the flow entries of table T0 and table T1 to the switch; if table T2 that is corresponding to ACL 3 and reported by the switch based on ASIC chip 2 meets the foregoing condition, but reported table T0 and table T1 cannot meet the foregoing condition, the controller cannot send, to the switch, a flow entry used for processing a packet of service A.

Apparently, if a switch based on ASIC chip 1 uses table T0 and table T1 to implement service A, a switch based on ASIC chip 2 uses table T2 to implement service A, and processing logic of a controller is generating flow entries of table T0 and table T1 for service A, the controller cannot generate or send a flow entry corresponding to service A when being connected to the switch based on ASIC chip 2; naturally, the switch based on ASIC chip 2 cannot configure a flow entry that processes service A, which causes that service A cannot be processed.

Processing logic of controllers manufactured by manufacturers is usually different, and hardware forwarding chips on which switches manufactured by manufacturers are based are also usually different; therefore, some service cannot be processed when a switch and a controller are connected, thereby causing a relatively high probability of failure in service processing.

SUMMARY

Embodiments of the present invention provide a flow entry configuration method, apparatus, and system, which are used to resolve a problem existing in the prior art that a relatively high probability of failure in service processing is caused because a switch cannot configure, in a hardware flow table, a flow entry used to process some services.

A first aspect provides a flow entry configuration method, where the method includes:

reporting, by a switch, a flow table structure to a controller by using the OpenFlow protocol, where the flow table structure includes match fields and actions that are supported by multiple OpenFlow flow tables and types of the multiple OpenFlow flow tables, there is an intersection among the match fields and actions that are supported by the multiple OpenFlow flow tables, the intersection includes a match field and an action that are used to implement a first service supported by a hardware flow table of the switch, and the types of the multiple OpenFlow flow tables are all a wildcard type;

receiving, by the switch, a flow entry sent by the controller by using the OpenFlow protocol, and configuring the flow entry into a software flow table, where the flow entry is generated by the controller according to the flow table structure and information about a data packet reported by the switch, the information about the data packet includes information about a first data packet of the first service, and the flow entry includes at least one of flow entries matching the first data packet;

acquiring, by the switch from the software flow table, a first flow entry matching the first data packet; processing the first data packet according to an action value in the first flow entry; and determining, in a preconfigured service path, a first target service path matching the first flow entry, where match fields of the determined first target service path include an ingress port match field and a packet header match field in match fields corresponding to match field values of the first flow entry, and an action of the first target service path includes an action corresponding to an action value that is in action values in the first flow entry and that is used to process the first data packet;

determining, by the switch according to a preconfigured correspondence between the first target service path and a first hardware flow table, the first hardware flow table corresponding to the first target service path, where the first hardware flow table corresponding to the first target service path supports a service supported by the first target service path; and configuring, by the switch, a flow entry of the first hardware flow table according to the first flow entry.

In a first possible implementation manner of the first aspect, the match fields of the multiple OpenFlow flow tables reported by the switch are all match fields supported by the OpenFlow protocol, and the actions of the multiple OpenFlow flow tables reported by the switch are all actions supported by the OpenFlow protocol.

With reference to the first aspect or the first possible implementation manner of the first aspect, in a second possible implementation manner, the determining, in a preconfigured service path, a first target service path matching the first flow entry specifically includes:

when there are two or more first flow entries, aggregating the first flow entries to generate a combined flow entry, where match field values included in the combined flow entry are match field values that are in match field values of the first flow entries and that are corresponding to the ingress port match field and the packet header match field, action values included in the combined flow entry are action values that are in action values of the first flow entries and that are used to process the first data packet; and determining, in the preconfigured service path, one service path in which match fields include match fields corresponding to the match field values of the combined flow entry and in which actions include actions corresponding to the action values of the combined flow entry, as the first target service path; and when there is one first flow entry, determining, in the preconfigured service path, one service path in which a match field includes a match field corresponding to a match field value in the first flow entry and in which an action includes an action corresponding to the action value in the first flow entry, as the first target service path.

With reference to the first aspect or the first or second possible implementation manner of the first aspect, in a third possible implementation manner, the intersection further includes a match field and an action that are used to implement a second service that is not supported by the hardware flow table of the switch, the information about the data packet further includes information about a second data packet of the second service, and the flow entry received by the switch from the controller further includes at least one of flow entries matching the second data packet; and the method further includes: acquiring, by the switch from the software flow table, a second flow entry matching the second data packet, and processing the second data packet according to an action of the second flow entry.

With reference to the third possible implementation manner of the first aspect, in a fourth possible implementation manner, the method further includes:

determining, by the switch in the preconfigured service path, a second target service path matching the second flow entry, where match fields of the determined second target service path include an ingress port match field and a packet header match field in match fields corresponding to match field values of the second flow entry, and an action of the second target service path includes an action corresponding to an action value that is in action values in the second flow entry and that is used to process the second data packet;

configuring, by the switch according to the second flow entry, a service flow entry of a service flow table corresponding to the second target service path, where the service flow table is an exact match table, and match fields of the service flow table are all match fields of the second target service path; configuring a first match field value in the service flow entry as a corresponding match field value in the second flow entry; configuring a second match field value in the service flow entry as a corresponding header field value in a packet header of the second data packet; and configuring an action value in the service flow entry as the action value in the second flow entry, where a match field corresponding to the first match field value belongs to a match field corresponding to the match field value in the second flow entry, and a match field corresponding to the second match field value does not belong to a match field corresponding to a match field value in the second flow entry; and searching, by the switch when receiving a subsequent data packet of the second service later, the service flow table for a service flow entry matching the subsequent data packet, and processing the subsequent data packet according to an action of the found service flow entry.

With reference to the first aspect or any one of the first to fourth possible implementation manners of the first aspect, in a fifth possible implementation manner, before the determining, according to a preconfigured correspondence between the first target service path and a first hardware flow table, the first hardware flow table corresponding to the first target service path, the method further includes: configuring a correspondence between service paths and corresponding hardware flow tables, where the service paths include the first target service path, specifically including:

configuring multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and configuring a correspondence between the service paths and the physical flow tables, where a match field of each service path is included in match fields of all corresponding physical flow tables, and an action of each service path is included in actions of all the corresponding physical flow tables; and the determining, by the switch according to a preconfigured correspondence between the first target service path and a first hardware flow table, the first hardware flow table corresponding to the first target service path specifically includes:

determining, by the switch, a first physical flow table according to a correspondence between the first target service path and the corresponding first physical flow table, and determining the first hardware flow table according to a correspondence between the first physical flow table and the corresponding first hardware flow table.

A second aspect provides a flow entry configuration method, where the method includes:

reporting, by a communications apparatus, a flow table structure to a controller by using the OpenFlow protocol, where the flow table structure includes match fields and actions that are supported by multiple OpenFlow flow tables and types of the multiple OpenFlow flow tables, there is an intersection among the match fields and actions that are supported by the multiple OpenFlow flow tables, the intersection includes a match field and an action that are used to implement a first service supported by a hardware flow table of a hardware forwarding chip, the types of the multiple OpenFlow flow tables are all a wildcard type, and the communications apparatus is connected to the hardware forwarding chip;

receiving, by the communications apparatus, a flow entry sent by the controller by using the OpenFlow protocol, and configuring the flow entry into a software flow table, where the flow entry is generated by the controller according to the flow table structure and information about a data packet reported by the communications apparatus, the information about the data packet includes information about a first data packet of the first service, and the flow entry includes at least one of flow entries matching the first data packet;

acquiring, by the communications apparatus from the software flow table, a first flow entry matching the first data packet; processing the first data packet according to an action value in the first flow entry; and determining, in a preconfigured service path, a first target service path matching the first flow entry, where match fields of the determined first target service path include an ingress port match field and a packet header match field in match fields corresponding to match field values of the first flow entry, and an action of the first target service path includes an action corresponding to an action value that is in action values in the first flow entry and that is used to process the first data packet;

determining, by the communications apparatus according to a preconfigured correspondence between the first target service path and a first hardware flow table in the hardware forwarding chip, the first hardware flow table corresponding to the first target service path, where the first hardware flow table corresponding to the first target service path supports a service supported by the first target service path; and configuring, by the communications apparatus, a flow entry of the first hardware flow table according to the first flow entry.

In a first possible implementation manner of the second aspect, the match fields of the multiple OpenFlow flow tables reported by the communications apparatus are all match fields supported by the OpenFlow protocol, and the actions of the multiple OpenFlow flow tables reported by the communications apparatus are all actions supported by the OpenFlow protocol.

With reference to the second aspect or the first possible implementation manner of the second aspect, in a second possible implementation manner, the determining, in a preconfigured service path, a first target service path matching the first flow entry specifically includes:

when there are two or more first flow entries, aggregating the first flow entries to generate a combined flow entry, where match field values included in the combined flow entry are match field values that are in match field values of the first flow entries and that are corresponding to the ingress port match field and the packet header match field, action values included in the combined flow entry are action values that are in action values of the first flow entries and that are used to process the first data packet; and determining, in the preconfigured service path, one service path in which match fields include match fields corresponding to the match field values of the combined flow entry and in which actions include actions corresponding to the action values of the combined flow entry, as the first target service path; and when there is one first flow entry, determining, in the preconfigured service path, one service path in which a match field includes a match field corresponding to a match field value in the first flow entry and in which an action includes an action corresponding to the action value in the first flow entry, as the first target service path.

With reference to the second aspect or the first or second possible implementation manner of the second aspect, in a third possible implementation manner, the intersection further includes a match field and an action that are used to implement a second service that is not supported by the hardware flow table of the hardware forwarding chip, the information about the data packet further includes information about a second data packet of the second service, and the flow entry received by the communications apparatus from the controller further includes at least one of flow entries matching the second data packet; and the method further includes: acquiring, by the communications apparatus from the software flow table, a second flow entry matching the second data packet, and processing the second data packet according to an action of the second flow entry.

With reference to the third possible implementation manner of the second aspect, in a fourth possible implementation manner, the method further includes:

determining, by the communications apparatus in the preconfigured service path, a second target service path matching the second flow entry, where match fields of the determined second target service path include an ingress port match field and a packet header match field in match fields corresponding to match field values of the second flow entry, and an action of the second target service path includes an action corresponding to an action value that is in action values in the second flow entry and that is used to process the second data packet;

configuring, by the communications apparatus according to the second flow entry, a service flow entry of a service flow table corresponding to the second target service path, where the service flow table is an exact match table, and match fields of the service flow table are all match fields of the second target service path; configuring a first match field value in the service flow entry as a corresponding match field value in the first flow entry; configuring a second match field value in the service flow entry as a corresponding header field value in a packet header of the second data packet; and configuring an action value in the service flow entry as the action value in the second flow entry, where a match field corresponding to the first match field value belongs to a match field corresponding to the match field value in the first flow entry, and a match field corresponding to the second match field value does not belong to a match field corresponding to a match field value in the second flow entry; and searching, by the communications apparatus when receiving a subsequent data packet of the second service later, the service flow table for a service flow entry matching the subsequent data packet, and processing the subsequent data packet according to an action of the found service flow entry.

With reference to the second aspect or any one of the first to fourth possible implementation manners of the second aspect, in a fifth possible implementation manner, before the determining, according to a preconfigured correspondence between the first target service path and a first hardware flow table, the first hardware flow table corresponding to the first target service path, the method further includes: configuring a correspondence between service paths and corresponding hardware flow tables, where the service paths include the first target service path, specifically including:

configuring multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and configuring a correspondence between the service paths and the physical flow tables, where a match field of each service path is included in match fields of all corresponding physical flow tables, and an action of each service path is included in actions of all the corresponding physical flow tables; and the determining, by the communications apparatus according to a preconfigured correspondence between the first target service path and a first hardware flow table, the first hardware flow table corresponding to the first target service path specifically includes:

determining, by the communications apparatus, a first physical flow table according to a correspondence between the first target service path and the corresponding first physical flow table, and determining the first hardware flow table according to a correspondence between the first physical flow table and the corresponding first hardware flow table.

A third aspect provides a communications apparatus for implementing flow entry configuration, where the communications apparatus is connected to a hardware forwarding chip, communicates with a controller by using the OpenFlow protocol, and includes: an interface unit, a software flow table configuring unit, a data packet processing unit, and a hardware flow table configuring unit, where:

the interface unit is configured to report a flow table structure to the controller, where the flow table structure includes match fields and actions that are supported by multiple OpenFlow flow tables and types of the multiple OpenFlow flow tables, there is an intersection among the match fields and actions that are supported by the multiple OpenFlow flow tables, the intersection includes a match field and an action that are used to implement a first service supported by a hardware flow table of the hardware forwarding chip, and the types of the multiple OpenFlow flow tables are all a wildcard type; and further configured to report information about a data packet to the controller and receive a flow entry sent by the controller, where the flow entry is generated by the controller according to the flow table structure and the information about the data packet, the information about the data packet includes information about a first data packet of the first service, and the flow entry includes at least one of flow entries matching the first data packet;

the software flow table configuring unit is configured to configure the flow entry received by the interface unit into a software flow table;

the data packet processing unit is configured to acquire, from the software flow table, a first flow entry matching the first data packet, process the first data packet according to an action value in the first flow entry, and determine, in a preconfigured service path, a first target service path matching the first flow entry, where match fields of the determined first target service path include an ingress port match field and a packet header match field in match fields corresponding to match field values of the first flow entry, an action of the first target service path includes an action corresponding to an action value that is in action values in the first flow entry and that is used to process the first data packet; and the data packet processing unit is configured to determine, according to a preconfigured correspondence between the first target service path and a first hardware flow table of the hardware forwarding chip, the first hardware flow table corresponding to the first target service path, where the first hardware flow table corresponding to the first target service path supports a service supported by the first target service path; and the hardware flow table configuring unit is configured to configure a flow entry of the first hardware flow table according to the first flow entry.

In a first possible implementation manner of the third aspect, the match fields of the multiple OpenFlow flow tables reported by the interface unit are all match fields supported by the OpenFlow protocol, and the actions of the multiple OpenFlow flow tables reported by the interface unit are all actions supported by the OpenFlow protocol.

With reference to the third aspect or the first possible implementation manner of the third aspect, in a second possible implementation manner, that the data packet processing unit is configured to determine, in a preconfigured service path, a first target service path matching the first flow entry specifically includes:

the data packet processing unit is configured to: when there are two or more first flow entries, aggregate the first flow entries to generate a combined flow entry, where match field values included in the combined flow entry are match field values that are in the match field values of the first flow entries and that are corresponding to the ingress port match field and the packet header match field, and action values included in the combined flow entry are action values that are in the action values of the first flow entries and that are used to process the first data packet; and determine, in the preconfigured service path, one service path in which match fields include match fields corresponding to the match field values of the combined flow entry and in which actions include actions corresponding to the action values of the combined flow entry, as the first target service path; and the data packet processing unit is configured to: when there is one first flow entry, determine, in the preconfigured service path, one service path in which a match field includes a match field corresponding to a match field value in the first flow entry and in which an action includes an action corresponding to the action value in the first flow entry, as the first target service path.

With reference to the third aspect or the first or second possible implementation manner of the third aspect, in a third possible implementation manner, the intersection further includes a match field and an action that are used to implement a second service that is not supported by the hardware flow table of the hardware forwarding chip, the information about the data packet further includes information about a second data packet of the second service, and the flow entry received by the interface unit from the controller further includes at least one of flow entries matching the second data packet; and the data packet processing unit is further configured to process the second data packet according to an action of a second flow entry when acquiring, from the software flow table, the second flow entry matching the second data packet.

With reference to the third possible implementation manner of the third aspect, in a fourth possible implementation manner, the communications apparatus further includes a service flow table configuring unit, where:

the data packet processing unit is further configured to: determine, in the preconfigured service path, a second target service path matching the second flow entry, where match fields of the determined second target service path include an ingress port match field and a packet header match field in match fields corresponding to match field values of the second flow entry, and an action of the second target service path includes an action corresponding to an action value that is in action values in the second flow entry and that is used to process the second data packet;

the service flow table configuring unit is configured to: configure, according to the second flow entry, a service flow entry of a service flow table corresponding to the second target service path, where the service flow table is an exact match table, and match fields of the service flow table are all match fields of the second target service path; configure a first match field value in the service flow entry as a corresponding match field value in the first flow entry; configure a second match field value in the service flow entry as a corresponding header field value in a packet header of the second data packet; and configure an action value in the service flow entry as the action value in the second flow entry, where a match field corresponding to the first match field value belongs to a match field corresponding to the match field value in the first flow entry, and a match field corresponding to the second match field value does not belong to a match field corresponding to a match field value in the second flow entry; and the data packet processing unit is further configured to: search, when receiving a subsequent data packet of the second service later, the service flow table for a service flow entry matching the subsequent data packet, and process the subsequent data packet according to an action of the found service flow entry.

With reference to the third aspect or any one of the first to fourth possible implementation manners of the third aspect, in a fifth possible implementation manner, the communications apparatus further includes a correspondence configuring unit, where:

the correspondence configuring unit is configured to configure a correspondence between service paths and corresponding hardware flow tables, where the service paths include the first target service path, which specifically includes: the correspondence configuring unit is configured to configure multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and the correspondence configuring unit is configured to configure a correspondence between the service paths and the physical flow tables, where a match field of each service path is included in match fields of all corresponding physical flow tables, and an action of each service path is included in actions of all the corresponding physical flow tables; and that the data packet processing unit is configured to determine, according to a preconfigured correspondence between the first target service path and a first hardware flow table, the first hardware flow table corresponding to the first target service path specifically includes: the data packet processing unit is configured to determine a first physical flow table according to a correspondence between the first target service path and the corresponding first physical flow table, and determine the first hardware flow table according to a correspondence between the first physical flow table and the corresponding first hardware flow table.

A fourth aspect provides a communications apparatus for implementing flow entry configuration, including a processor and a memory, where:

the memory is configured to store a computer operation instruction; and the processor is configured to execute the computer operation instruction stored in the memory, so that the communications apparatus implements the following operations:

reporting a flow table structure to a controller by using the OpenFlow protocol, where the flow table structure includes match fields and actions that are supported by multiple OpenFlow flow tables and types of the multiple OpenFlow flow tables, there is an intersection among the match fields and actions that are supported by the multiple OpenFlow flow tables, the intersection includes a match field and an action that are used to implement a first service supported by a hardware flow table of a hardware forwarding chip, the types of the multiple OpenFlow flow tables are all a wildcard type, and the communications apparatus is connected to the hardware forwarding chip;

receiving a flow entry that is generated according to the flow table structure and sent by the controller by using the OpenFlow protocol, and configuring the flow entry into a software flow table, where the flow entry is generated by the controller according to the flow table structure and information about a data packet reported by the communications apparatus, the information about the data packet includes information about a first data packet of the first service, and the flow entry includes at least one of flow entries matching the first data packet;

acquiring, from the software flow table, a first flow entry matching the first data packet; processing the first data packet according to an action value in the first flow entry; and determining, in a preconfigured service path, a first target service path matching the first flow entry, where match fields of the determined first target service path include an ingress port match field and a packet header match field in match fields corresponding to match field values of the first flow entry, and an action of the first target service path includes an action corresponding to an action value that is in action values in the first flow entry and that is used to process the first data packet;

configuring, according to a preconfigured correspondence between the first target service path and a first hardware flow table in the hardware forwarding chip, the first hardware flow table corresponding to the first target service path, where the first hardware flow table corresponding to the first target service path supports a service supported by the first target service path; and configuring a flow entry of the first hardware flow table according to the first flow entry.

In a first possible implementation manner of the fourth aspect, the processor executes the computer operation instruction, so that, specifically, the match fields of the multiple OpenFlow flow tables reported by the communications apparatus are all match fields supported by the OpenFlow protocol, and the actions of the reported multiple OpenFlow flow tables are all actions supported by the OpenFlow protocol.

With reference to the fourth aspect or the first possible implementation manner of the fourth aspect, in a second possible implementation manner, the processor executes the computer operation instruction, so that the communications apparatus specifically implements the following operations:

when there are two or more first flow entries, aggregating the first flow entries to generate a combined flow entry, where match field values included in the combined flow entry are match field values that are in match field values of the first flow entries and that are corresponding to the ingress port match field and the packet header match field, action values included in the combined flow entry are action values that are in action values of the first flow entries and that are used to process the first data packet; and determining, in the preconfigured service path, one service path in which match fields include match fields corresponding to the match field values of the combined flow entry and in which actions include actions corresponding to the action values of the combined flow entry, as the first target service path; and when there is one first flow entry, determining, in the preconfigured service path, one service path in which a match field includes a match field corresponding to a match field value in the first flow entry and in which an action includes an action corresponding to the action value in the first flow entry, as the first target service path.

With reference to the fourth aspect or the first or second possible implementation manner of the fourth aspect, in a third possible implementation manner, the intersection further includes a match field and an action that are used to implement a second service that is not supported by the hardware flow table of the hardware forwarding chip, the information about the data packet further includes information about a second data packet of the second service, and the flow entry received from the controller further includes at least one of flow entries matching the second data packet; and the processor executes the computer operation instruction, so that the communications apparatus further implements the following operations: acquiring, from the software flow table, a second flow entry matching the second data packet, and processing the second data packet according to an action of the second flow entry With reference to third possible implementation manner of the fourth aspect, in a fourth possible implementation manner, the processor executes the computer operation instruction, so that the communications apparatus further implements the following operations:

determining, in the preconfigured service path, a second target service path matching the second flow entry, where match fields of the determined second target service path include an ingress port match field and a packet header match field in match fields corresponding to match field values of the second flow entry, and an action of the second target service path includes an action corresponding to an action value that is in action values in the second flow entry and that is used to process the second data packet;

configuring, according to the second flow entry, a service flow entry of a service flow table corresponding to the second target service path, where the service flow table is an exact match table, and match fields of the service flow table are all match fields of the second target service path; configuring a first match field value in the service flow entry as a corresponding match field value in the first flow entry; configuring a second match field value in the service flow entry as a corresponding header field value in a packet header of the second data packet; and configuring an action value in the service flow entry as the action value in the second flow entry, where a match field corresponding to the first match field value belongs to a match field corresponding to the match field value in the first flow entry, and a match field corresponding to the second match field value does not belong to a match field corresponding to a match field value in the second flow entry; and searching, when receiving a subsequent data packet of the second service later, the service flow table for a service flow entry matching the subsequent data packet, and processing the subsequent data packet according to an action of the found service flow entry.

With reference to the fourth aspect or any one of the first to fourth possible implementation manners of the fourth aspect, in a fifth possible implementation manner, the processor executes the computer operation instruction, so that the communications apparatus further implements the following operations: configuring a correspondence between service paths and corresponding hardware flow tables, where the service paths include the first target service path, specifically including:

configuring multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and configuring a correspondence between the service paths and the physical flow tables, where a match field of each service path is included in match fields of all corresponding physical flow tables, and an action of each service path is included in actions of all the corresponding physical flow tables; and that the processor executes the computer operation instruction, so that the communications apparatus determines, according to a preconfigured correspondence between the first target service path and a first hardware flow table, the first hardware flow table corresponding to the first target service path specifically includes:

the processor executes the computer operation instruction, so that the communications apparatus specifically determines a first physical flow table according to a correspondence between the first target service path and the corresponding first physical flow table, and determines the first hardware flow table according to a correspondence between the first physical flow table and the corresponding first hardware flow table.

A fifth aspect provides a flow entry configuration method, including:

reporting, by a switch, information about a data packet of a first service to a controller;

receiving, by the switch, a flow entry that is of the first service and that is delivered by the controller according to the information about the data packet of the first service and a flow table structure, where the flow table structure includes match fields and actions that are supported by multiple flow tables, a match field supported by each of the multiple flow tables includes a match field of the first service, and an action supported by each of the multiple flow tables includes an action of the first service;

determining, by the switch in a preconfigured service path, a first target service path matching the flow entry of the first service, where a match field of the first target service path includes the match field of the first service, and an action of the target service path includes the action of the first service;

determining, by the switch, a target hardware flow table according to a preconfigured correspondence between the service path and a hardware flow table of the switch, where the target hardware flow table supports a service supported by the first target service path; and configuring, by the switch, a flow entry of the target hardware flow table according to the flow entry of the first service.

In a first possible implementation manner of the fifth aspect, the switch communicates with the controller by using the OpenFlow protocol, and the multiple flow tables are OpenFlow flow tables.

With reference to the first possible implementation manner of the fifth aspect, in a second possible implementation manner, the match fields of the multiple flow tables are all match fields supported by the OpenFlow protocol, and the actions of the multiple flow tables are all actions supported by the OpenFlow protocol.

With reference to the fifth aspect or the first or second possible implementation manner of the fifth aspect, in a third possible implementation manner, the determining, by the switch in a preconfigured service path, a first target service path matching the flow entry of the first service specifically includes:

configuring, by the switch, the flow entry of the first service into a software flow table; and acquiring, by the switch from the software flow table, a first target flow entry matching the data packet of the first service, and determining, in the preconfigured service path, the first target service path matching the first target flow entry, where match fields of the determined first target service path include an ingress port match field and a packet header match field in match fields corresponding to match field values of the first target flow entry, and an action of the determined first target service path includes an action that is in an action value in the first target flow entry and that is used to process the data packet of the first service; and the configuring, by the switch, a flow entry of the target hardware flow table according to the flow entry of the first service specifically includes: configuring, by the switch, the flow entry of the target hardware flow table according to the first target flow entry.

With reference to the third possible implementation manner of the fifth aspect, in a fourth possible implementation manner, the determining, in the preconfigured service path, the first target service path matching the first target flow entry specifically includes:

when there are two or more first target flow entries, aggregating the first target flow entries to generate a combined flow entry, where match field values of the combined flow entry are match field values that are in the first target flow entries and that are corresponding to the ingress port match field and the packet header match field, and an action value of the combined flow entry is an action value that is in the first target flow entries and that is used to process the data packet of the first service; and determining, in the preconfigured service path, one service path that includes match fields corresponding to the match field values of the combined flow entry and that includes actions corresponding to the action values of the combined flow entry, as the first target service path; and when there is one first target flow entry, determining, in the preconfigured service path, one service path that includes a match field corresponding to a match field value in the first target flow entry and that includes an action corresponding to the action value in the first target flow entry, as the first target service path.

With reference to the fifth aspect or any one of the first to fourth possible implementation manners of the fifth aspect, in a fifth possible implementation manner, the match field and the action that are supported by each of the multiple flow tables further include a match field and an action of a second service, and the second service is a service that is not supported by the hardware flow table of the switch; and the method further includes:

reporting, by the switch, information about a data packet of the second service to the controller; and receiving, by the switch, a flow entry that is of the second service and that is delivered by the controller according to the information about the data packet of the second service and the flow table structure, and configuring the flow entry of the second service into the software flow table.

With reference to the fifth possible implementation manner of the fifth aspect, in a sixth possible implementation manner, after the configuring the flow entry of the second service into the software flow table, the method further includes:

acquiring, by the switch from the software flow table, a second target flow entry matching the data packet of the second service;

determining, by the switch in the preconfigured service path, a second target service path matching the second target flow entry, where match fields of the determined second target service path include an ingress port match field and a packet header match field in match fields corresponding to match field values of the second target flow entry, and an action of the determined second target service path includes an action that is in an action value in the second target flow entry and that is used to process the data packet of the second service;

configuring, by the switch according to the second target flow entry, a service flow entry of a service flow table corresponding to the second target service path, where the service flow table is an exact match table, and match fields of the service flow table are all match fields of the second target service path; configuring a first match field value in the service flow entry to a match field value in the second target flow entry; configuring a second match field value in the service flow entry to a header field value in a packet header of the data packet of the second service; and configuring an action value in the service flow entry to the action value in the second target flow entry, where a match field corresponding to the first match field value belongs to a match field corresponding to a match field value in the second flow entry, and a match field corresponding to the second match field value does not belong to the match field corresponding to the match field value in the second flow entry; and searching, by the switch when receiving a subsequent data packet of the second service later, the service flow table for a service flow entry matching the subsequent data packet, and processing the subsequent data packet according to an action of the found service flow entry.

With reference to the fifth aspect or any one of the first to sixth possible implementation manners of the fifth aspect, in a seventh possible implementation manner, before the determining a target hardware flow table according to a preconfigured correspondence between the service path and a hardware flow table, the method further includes: configuring a correspondence between service paths and corresponding hardware flow tables, which specifically includes:

configuring multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and configuring a correspondence between the service paths and the physical flow tables, where a match field of each service path is included in match fields of all corresponding physical flow tables, and an action of each service path is included in actions of all the corresponding physical flow tables; and the determining, by the switch, a target hardware flow table according to a preconfigured correspondence between the service path and a hardware flow table specifically includes:

determining, by the switch, a first physical flow table according to a correspondence between the first target service path and the corresponding first physical flow table, and determining the target hardware flow table according to a correspondence between the first physical flow table and the corresponding target hardware flow table.

With reference to the fifth aspect or any one of the first to seventh possible implementation manners of the fifth aspect, in an eighth possible implementation manner, before the reporting, by a switch, information about a data packet of a first service to a controller, the method further includes: reporting, by the switch, the flow table structure to the controller.

With reference to the fifth aspect or any one of the first to eighth possible implementation manners of the fifth aspect, in a ninth possible implementation manner, the flow table structure further includes types of the multiple flow tables, and the types of the multiple flow tables are a wildcard type.

A sixth aspect provides a flow entry configuration method, including:

reporting, by a communications apparatus, information about a data packet of a first service to a controller;

receiving, by the communications apparatus, a flow entry that is of the first service and that is delivered by the controller according to the information about the data packet of the first service and a flow table structure, where the flow table structure includes match fields and actions that are supported by multiple flow tables, a match field supported by each of the multiple flow tables includes a match field of the first service, and an action supported by each of the multiple flow tables includes an action of the first service;

determining, by the communications apparatus in a preconfigured service path, a first target service path matching the flow entry of the first service, where a match field of the first target service path includes the match field of the first service, and an action of the target service path includes the action of the first service;

determining, by the communications apparatus, a target hardware flow table according to a preconfigured correspondence between the service path and a hardware flow table of a hardware forwarding chip connected to the communications apparatus, where the target hardware flow table supports a service supported by the first target service path; and configuring, by the communications apparatus, a flow entry of the target hardware flow table according to the flow entry of the first service.

In a first possible implementation manner of the sixth aspect, the communications apparatus communicates with the controller by using the OpenFlow protocol, and the flow tables are OpenFlow flow tables; the match fields of the multiple flow tables are all match fields supported by the OpenFlow protocol, and the actions of the multiple flow tables are all actions supported by the OpenFlow protocol.

With reference to the sixth aspect or the first possible implementation manner of the sixth aspect, in a second possible implementation manner, the determining, by the communications apparatus in a preconfigured service path, a first target service path matching the flow entry of the first service specifically includes:

configuring, by the communications apparatus, the flow entry of the first service into a software flow table; and acquiring, by the communications apparatus from the software flow table, a first target flow entry matching the data packet of the first service, and determining, in the preconfigured service path, the first target service path matching the first target flow entry, where match fields of the determined first target service path include an ingress port match field and a packet header match field in match fields corresponding to match field values of the first target flow entry, and an action of the determined first target service path includes an action that is in an action value in the first target flow entry and that is used to process the data packet of the first service; and the configuring, by the communications apparatus, a flow entry of the target hardware flow table according to the flow entry of the first service specifically includes: configuring, by the communications apparatus, the flow entry of the target hardware flow table according to the first target flow entry.

With reference to the second possible implementation manner of the sixth aspect, in a third possible implementation manner, the determining, in the preconfigured service path, the first target service path matching the first target flow entry specifically includes:

when there are two or more first target flow entries, aggregating the first target flow entries to generate a combined flow entry, where match field values of the combined flow entry are match field values that are in the first target flow entries and that are corresponding to the ingress port match field and the packet header match field, and an action value of the combined flow entry is an action value that is in the first target flow entries and that is used to process the data packet of the first service; and determining, in the preconfigured service path, one service path that includes match fields corresponding to the match field values of the combined flow entry and that includes actions corresponding to the action values of the combined flow entry, as the first target service path; and when there is one first target flow entry, determining, in the preconfigured service path, one service path that includes a match field corresponding to a match field value in the first target flow entry and that includes an action corresponding to the action value in the first target flow entry, as the first target service path.

With reference to the sixth aspect or any one of the first to third possible implementation manners of the sixth aspect, in a fourth possible implementation manner, the match field and the action that are supported by each of the multiple flow tables further include a match field and an action of a second service, and the second service is a service that is not supported by the hardware flow table of the switch; and the method further includes:

reporting, by the communications apparatus, information about a data packet of the second service to the controller; and receiving, by the communications apparatus, a flow entry that is of the second service and that is delivered by the controller according to the information about the data packet of the second service and the flow table structure, and configuring the flow entry of the second service into the software flow table.

With reference to the fourth possible implementation manner of the sixth aspect, in a fifth possible implementation manner, after the configuring the flow entry of the second service into the software flow table, the method further includes:

acquiring, by the communications apparatus from the software flow table, a second target flow entry matching the data packet of the second service;

determining, by the communications apparatus in the preconfigured service path, a second target service path matching the second target flow entry, where match fields of the determined second target service path include an ingress port match field and a packet header match field in match fields corresponding to match field values of the second target flow entry, and an action of the determined second target service path includes an action that is in an action value in the second target flow entry and that is used to process the data packet of the second service;

configuring, by the communications apparatus according to the second target flow entry, a service flow entry of a service flow table corresponding to the second target service path, where the service flow table is an exact match table, and match fields of the service flow table are all match fields of the second target service path; configuring a first match field value in the service flow entry to a match field value in the second target flow entry; configuring a second match field value in the service flow entry to a header field value in a packet header of the data packet of the second service; and configuring an action value in the service flow entry to the action value in the second target flow entry, where a match field corresponding to the first match field value belongs to a match field corresponding to the match field value in the second target flow entry, and a match field corresponding to the second match field value does not belong to a match field corresponding to a match field value in the second flow entry; and searching, by the communications apparatus when receiving a subsequent data packet of the second service later, the service flow table for a service flow entry matching the subsequent data packet, and processing the subsequent data packet according to an action of the found service flow entry.

With reference to the sixth aspect or any one of the first to fifth possible implementation manners of the sixth aspect, in a sixth possible implementation manner, before the determining a target hardware flow table according to a preconfigured correspondence between the service path and a hardware flow table, the method further includes: configuring a correspondence between service paths and corresponding hardware flow tables, which specifically includes:

configuring multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and configuring a correspondence between the service paths and the physical flow tables, where a match field of each service path is included in match fields of all corresponding physical flow tables, and an action of each service path is included in actions of all the corresponding physical flow tables; and the determining, by the communications apparatus, a target hardware flow table according to a preconfigured correspondence between the service path and a hardware flow table specifically includes:

determining, by the communications apparatus, a first physical flow table according to a correspondence between the first target service path and the corresponding first physical flow table, and determining the target hardware flow table according to a correspondence between the first physical flow table and the target hardware flow table.

With reference to the sixth aspect or any one of the first to sixth possible implementation manners of the sixth aspect, in a seventh possible implementation manner, the flow table structure further includes types of the multiple flow tables, and the types of the multiple flow tables are a wildcard type.

A seventh aspect provides a communications apparatus for implementing flow entry configuration, where the communications apparatus is connected to a hardware forwarding chip, and includes an interface unit, a data packet processing unit, and a hardware flow table configuring unit, where:

the interface unit is configured to report information about a data packet of a first service to a controller, and further configured to receive a flow entry that is of the first service and that is delivered by the controller according to the information about the data packet of the first service and a flow table structure, where the flow table structure includes match fields and actions that are supported by multiple flow tables, a match field supported by each of the multiple flow tables includes a match field of the first service, and an action supported by each of the multiple flow tables includes an action of the first service;

the data packet processing unit is configured to determine, in a preconfigured service path, a first target service path matching the flow entry of the first service, where a match field of the first target service path includes the match field of the first service, and an action of the first target service path includes the action of the first service; and the data packet processing unit is configured to determine a target hardware flow table according to a preconfigured correspondence between the service path and a hardware flow table of the hardware forwarding chip, where the target hardware flow table supports a service supported by the first target service path; and the hardware flow table configuring unit is configured to configure a flow entry of the target hardware flow table according to the flow entry of the first service.

In a first possible implementation manner of the seventh aspect, the communications apparatus communicates with the controller by using the OpenFlow protocol, and the flow tables are OpenFlow flow tables; the match fields of the multiple flow tables are all match fields supported by the OpenFlow protocol, and the actions of the multiple flow tables are all actions supported by the OpenFlow protocol.

With reference to the seventh aspect or the first possible implementation manner of the seventh aspect, in a second possible implementation manner, that the data packet processing unit is configured to determine, in a preconfigured service path, a first target service path matching the flow entry of the first service specifically includes:

the data packet processing unit is configured to: configure the flow entry of the first service into a software flow table, acquire, from the software flow table, a first target flow entry matching the data packet of the first service, and determine, in the preconfigured service path, the first target service path matching the first target flow entry, where match fields of the determined first target service path include an ingress port match field and a packet header match field in match fields corresponding to match field values of the first target flow entry, and an action of the determined first target service path includes an action that is in an action value in the first target flow entry and that is used to process the data packet of the first service; and the hardware flow table configuring unit is specifically configured to configure the flow entry of the target hardware flow table according to the first target flow entry.

With reference to the second possible implementation manner of the seventh aspect, in a third possible implementation manner, that the data packet processing unit is configured to determine, in the preconfigured service path, the first target service path matching the first target flow entry specifically includes:

the data packet processing unit is configured to: when there are two or more first target flow entries, aggregate the first target flow entries to generate a combined flow entry, where match field values of the combined flow entry are match field values that are in the first target flow entries and that are corresponding to the ingress port match field and the packet header match field, and an action value of the combined flow entry is an action value that is in the first target flow entries and that is used to process the data packet of the first service; and determine, in the preconfigured service path, one service path that includes match fields corresponding to the match field values of the combined flow entry and that includes actions corresponding to the action values of the combined flow entry, as the first target service path; and the data packet processing unit is configured to: when there is one first target flow entry, determine, in the preconfigured service path, one service path that includes a match field corresponding to a match field value in the first target flow entry and that includes an action corresponding to the action value in the first target flow entry, as the first target service path.

With reference to the seventh aspect or any one of the first to third possible implementation manners of the seventh aspect, in a fourth possible implementation manner, the match field and the action that are supported by each of the multiple flow tables further include a match field and an action of a second service, and the second service is a service that is not supported by the hardware flow table of the switch; and the interface unit is further configured to report information about a data packet of the second service to the controller, and receive a flow entry that is of the second service and that is delivered by the controller according to the information about the data packet of the second service and the flow table structure; and the data packet processing unit is further configured to configure the flow entry that is of the second service and that is received by the interface unit into the software flow table.

With reference to the seventh aspect or any one of the first to fourth possible implementation manners of the seventh aspect, in a fifth possible implementation manner, the communications apparatus further includes a service flow table configuring unit, where:

the data packet processing unit is further configured to acquire, from the software flow table, a second target flow entry matching the data packet of the second service, and determine, in the preconfigured service path, a second target service path matching the second target flow entry, where match fields of the determined second target service path include an ingress port match field and a packet header match field in match fields corresponding to match field values of the second target flow entry, and an action of the determined second target service path includes an action that is in an action value in the second target flow entry and that is used to process the data packet of the second service;

the service flow table configuring unit is configured to: configure, according to the second target flow entry, a service flow entry of a service flow table corresponding to the second target service path, where the service flow table is an exact match table, and match fields of the service flow table are all match fields of the second target service path; configure a first match field value in the service flow entry to a match field value in the second target flow entry; configure a second match field value in the service flow entry to a header field value in a packet header of the data packet of the second service; and configure an action value in the service flow entry to the action value in the second target flow entry, where a match field corresponding to the first match field value belongs to a match field corresponding to the match field value in the second target flow entry, and a match field corresponding to the second match field value does not belong to a match field corresponding to a match field value in the second flow entry; and the data packet processing unit is further configured to: search, when receiving a subsequent data packet of the second service later, the service flow table for a service flow entry matching the subsequent data packet, and process the subsequent data packet according to an action of the found service flow entry.

With reference to the seventh aspect or any one of the first to fifth possible implementation manners of the seventh aspect, in a sixth possible implementation manner, the communications apparatus further includes a correspondence configuring unit, where:

the correspondence configuring unit is configured to configure a correspondence between service paths and corresponding hardware flow tables, which specifically includes: the correspondence configuring unit is configured to configure multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and the correspondence configuring unit is configured to configure a correspondence between the service paths and the physical flow tables, where a match field of each service path is included in match fields of all corresponding physical flow tables, and an action of each service path is included in actions of all the corresponding physical flow tables; and the data packet processing unit is configured to determine a target hardware flow table according to a preconfigured correspondence between the service path and a hardware flow table, which specifically includes: the data packet processing unit is configured to determine a first physical flow table according to a correspondence between the first target service path and the corresponding first physical flow table, and determine the target hardware flow table according to a correspondence between the first physical flow table and the corresponding target hardware flow table.

An eighth aspect provides a communications apparatus for implementing flow entry configuration, including a processor and a memory, where:

the memory is configured to store a computer operation instruction; and the processor is configured to execute the computer operation instruction stored in the memory, so that the communications apparatus implements the following operations:

reporting information about a data packet of a first service to a controller;

receiving a flow entry that is of the first service and that is delivered by the controller according to the information about the data packet of the first service and a flow table structure, where the flow table structure includes match fields and actions that are supported by multiple flow tables, a match field supported by each of the multiple flow tables includes a match field of the first service, and an action supported by each of the multiple flow tables includes an action of the first service;

determining, in a preconfigured service path, a first target service path matching the flow entry of the first service, where a match field of the first target service path includes the match field of the first service, and an action of the target service path includes the action of the first service;

determining a target hardware flow table according to a preconfigured correspondence between the service path and a hardware flow table of a hardware forwarding chip connected to the communications apparatus, where the target hardware flow table supports a service supported by the first target service path; and configuring a flow entry of the target hardware flow table according to the flow entry of the first service.

In a first possible implementation manner of the eighth aspect, the communications apparatus communicates with the controller by using the OpenFlow protocol, and the flow tables are OpenFlow flow tables; the match fields of the multiple flow tables are all match fields supported by the OpenFlow protocol, and the actions of the multiple flow tables are all actions supported by the OpenFlow protocol.

With reference to the eighth aspect or the first possible implementation manner of the eighth aspect, in a second possible implementation manner, the processor executes the computer operation instruction, so that the communications apparatus specifically implements the following operations:

configuring the flow entry of the first service into a software flow table; and acquiring, from the software flow table, a first target flow entry matching the data packet of the first service, and determining, in the preconfigured service path, the first target service path matching the first target flow entry, where match fields of the determined first target service path include an ingress port match field and a packet header match field in match fields corresponding to match field values of the first target flow entry, and an action of the determined first target service path includes an action that is in an action value in the first target flow entry and that is used to process the data packet of the first service; and the configuring a flow entry of the target hardware flow table according to the flow entry of the first service specifically includes: configuring, by the communications apparatus, the flow entry of the target hardware flow table according to the first target flow entry.

With reference to second possible implementation manner of the eighth aspect, in a third possible implementation manner, the processor executes the computer operation instruction, so that the communications apparatus specifically implements the following operations:

when there are two or more first target flow entries, aggregating the first target flow entries to generate a combined flow entry, where match field values of the combined flow entry are match field values that are in the first target flow entries and that are corresponding to the ingress port match field and the packet header match field, and an action value of the combined flow entry is an action value that is in the first target flow entries and that is used to process the data packet of the first service; and determining, in the preconfigured service path, one service path that includes match fields corresponding to the match field values of the combined flow entry and that includes actions corresponding to the action values of the combined flow entry, as the first target service path; and when there is one first target flow entry, determining, in the preconfigured service path, one service path that includes a match field corresponding to a match field value in the first target flow entry and that includes an action corresponding to the action value in the first target flow entry, as the first target service path.

With reference to the eighth aspect or any one of the first to third possible implementation manners of the eighth aspect, in a fourth possible implementation manner, the match field and the action that are supported by each of the multiple flow tables further include a match field and an action of a second service, and the second service is a service that is not supported by the hardware flow table of the switch; and the processor executes the computer operation instruction, so that the communications apparatus further implements the following operations:

reporting information about a data packet of the second service to the controller; and receiving a flow entry that is of the second service and that is delivered by the controller according to the information about the data packet of the second service and the flow table structure, and configuring the flow entry of the second service into the software flow table.

With reference to fourth possible implementation manner of the eighth aspect, in a fifth possible implementation manner, the processor executes the computer operation instruction, so that the communications apparatus further implements the following operations:

acquiring, from the software flow table, a second target flow entry matching the data packet of the second service;

determining, in the preconfigured service path, a second target service path matching the second target flow entry, where match fields of the determined second target service path include an ingress port match field and a packet header match field in match fields corresponding to match field values of the second target flow entry, and an action of the determined second target service path includes an action that is in an action value in the second target flow entry and that is used to process the data packet of the second service;

configuring, according to the second target flow entry, a service flow entry of a service flow table corresponding to the second target service path, where the service flow table is an exact match table, and match fields of the service flow table are all match fields of the second target service path; configuring a first match field value in the service flow entry to a match field value in the second target flow entry; configuring a second match field value in the service flow entry to a header field value in a packet header of the data packet of the second service; and configuring an action value in the service flow entry to the action value in the second target flow entry, where a match field corresponding to the first match field value belongs to a match field corresponding to the match field value in the second target flow entry, and a match field corresponding to the second match field value does not belong to a match field corresponding to a match field value in the second flow entry; and searching, when receiving a subsequent data packet of the second service later, the service flow table for a service flow entry matching the subsequent data packet, and processing the subsequent data packet according to an action of the found service flow entry; or determining, in the preconfigured service path, a second target service path matching the second flow entry, where match fields of the determined second target service path include an ingress port match field and a packet header match field in match fields corresponding to match field values of the second flow entry, and an action of the second target service path includes an action corresponding to an action value that is in action values in the second flow entry and that is used to process the second data packet;

configuring, according to the second flow entry, a service flow entry of a service flow table corresponding to the second target service path, where the service flow table is an exact match table, and match fields of the service flow table are all match fields of the second target service path; configuring a first match field value in the service flow entry as a match field value in the first flow entry; configuring a second match field value in the service flow entry as a header field value in a packet header of the second data packet; and configuring an action value in the service flow entry as the action value in the second flow entry, where a match field corresponding to the first match field value belongs to a match field corresponding to the match field value in the first flow entry, and a match field corresponding to the second match field value does not belong to a match field corresponding to a match field value in the second flow entry; and searching, when receiving a subsequent data packet of the second service later, the service flow table for a service flow entry matching the subsequent data packet, and processing the subsequent data packet according to an action of the found service flow entry.

With reference to the eighth aspect or any one of the first to fifth possible implementation manners of the eighth aspect, in a sixth possible implementation manner, the processor executes the computer operation instruction, so that the communications apparatus further implements the following operations: configuring a correspondence between service paths and corresponding hardware flow tables, and the configuring a correspondence between service paths and corresponding hardware flow tables specifically includes:

configuring multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and configuring a correspondence between the service paths and the physical flow tables, where a match field of each service path is included in match fields of all corresponding physical flow tables, and an action of each service path is included in actions of all the corresponding physical flow tables; and that the processor executes the computer operation instruction, so that the communications apparatus determines the target hardware flow table according to the preconfigured correspondence between the service path and the hardware flow table specifically includes:

the processor executes the computer operation instruction, so that the communications apparatus specifically determines a first physical flow table according to a correspondence between the first target service path and the corresponding first physical flow table, and determines the target hardware flow table according to a correspondence between the first physical flow table and the target hardware flow table.

A ninth aspect provides a switch, including:

a hardware forwarding chip; and the communications apparatus according to the third aspect or any one of the first to fifth possible implementation manners of the third aspect, or the communications apparatus according to the fourth aspect or any one of the first to fifth possible implementation manners of the fourth aspect, or the communications apparatus according to the seventh aspect or any one of the first to sixth possible implementation manners of the seventh aspect, or the communications apparatus according to the eighth aspect or any one of the first to sixth possible implementation manners of the eighth aspect.

A tenth aspect provides a communications system, including a controller and the switch according to the ninth aspect.

According to the embodiments of the present invention, all the multiple OpenFlow flow tables may be used to implement the first service, and therefore, according to the processing logic of the controller, no matter a flow entry of which flow table or which flow tables is generated for the first service, the flow entry may be successfully generated and sent. In addition, the first target service path determined by the switch includes a match field and an action that are corresponding to the match field value and the action value of the data packet of the first service; therefore, the first target service path supports the first service. Moreover, because the hardware flow table corresponding to the first target service path supports the service supported by the first target service path, the hardware flow table corresponding to the first target service path is a hardware flow table supporting the first service. Further, the switch may configure, in the hardware flow table, a flow entry used to implement the first service. Therefore, no matter to which controller the switch is connected, the switch can successfully configure, in the hardware flow table, the flow entry used to implement the first service, so as to successfully process the first service, thereby reducing a probability of failure in service processing.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2 is a schematic flowchart of a method according to Embodiment 1 of the present invention;

FIG. 3-1 to FIG. 3-2 are schematic structural diagrams of a communications apparatus 200 according to Embodiment 2 of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
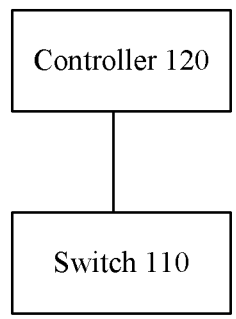
FIG. 1-1 to FIG. 1-2 are schematic diagrams of a networking structure of a communications system according to an embodiment of the present invention.

FIG. 1-1 is a schematic diagram of a networking structure of a communications system according to an embodiment of the present invention. The communications system includes a switch 110 and a controller 120, where the switch 110 communicates with the controller 120 by using the OpenFlow protocol.

Figures 1, 2:
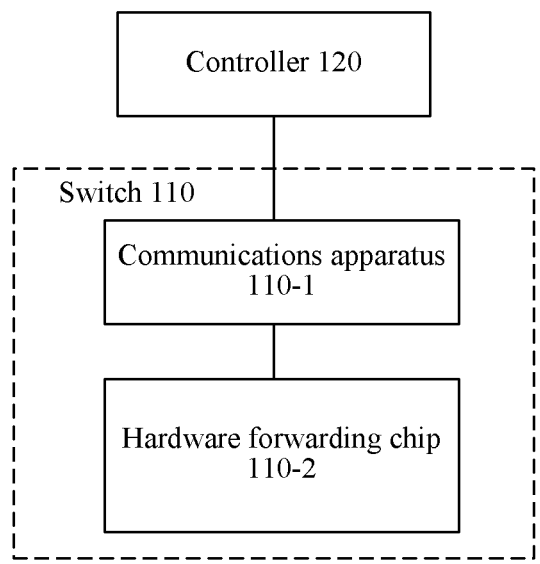
Figure 2:
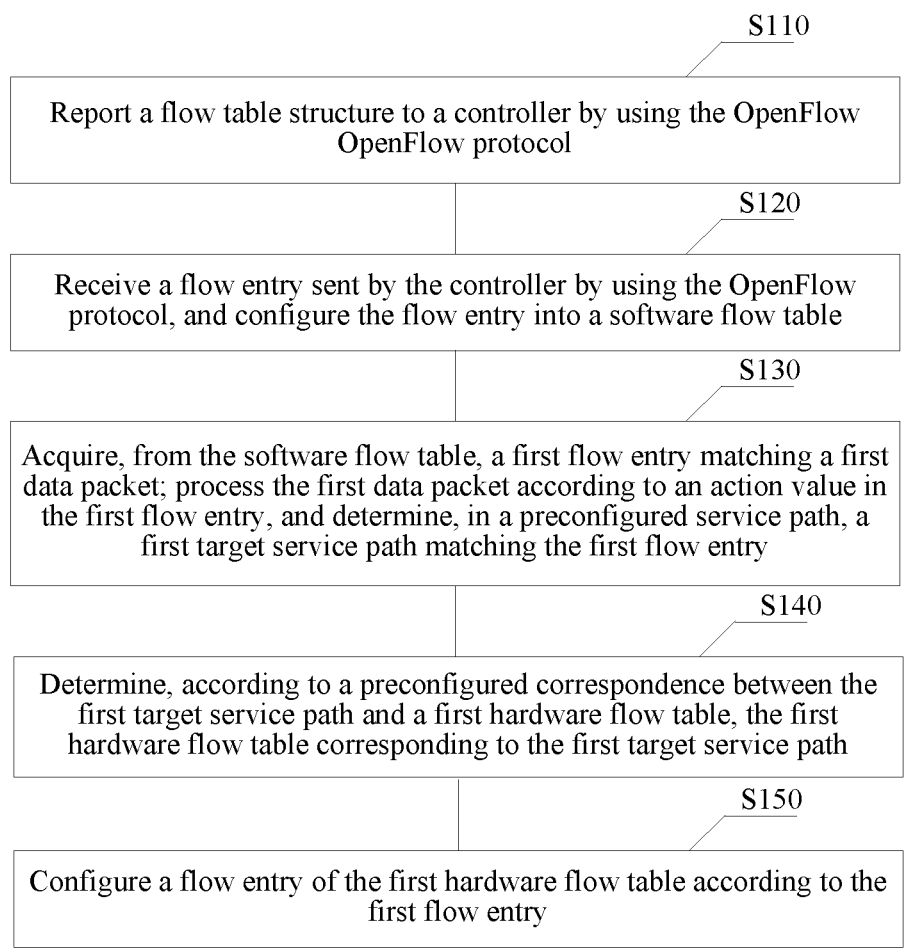

As shown in FIG. 1-2, the switch 110 may include an upper layer communications apparatus 110-1 and a lower layer hardware forwarding chip 110-2, where the hardware forwarding chip 110-2 may specifically be an application-specific integrated circuit (ASIC) chip, and the hardware forwarding chip includes a hardware flow table such as access control list (ACL) 1 and ACL 2.

A method, an apparatus, and a system provided by embodiments of the present invention are applied to a software defined network (SDN) system, where the SDN system includes a controller and a switch. A protocol used for communication between the controller and the switch may be the OpenFlow protocol, or may be a proprietary protocol or another standard protocol. A flow table structure used by the controller to deliver a flow entry may be reported by the switch to the controller, or may be preconfigured on the controller. In addition, when the controller communicates with the switch by using the OpenFlow protocol, the flow table structure includes a match field and an action supported by an OpenFlow flow table.

The following embodiments are described in detail by using an example in which the OpenFlow protocol is used. An implementation manner in which another protocol is used is similar to an implementation manner in which the OpenFlow protocol is used, reference may be made to implementation manners in the following embodiments, and details are not described again.

FIG. 2 is a schematic flowchart of a method according to Embodiment 1 of the present invention. The method according to Embodiment 1 of the present invention may be applied to the communications system shown in FIG. 1-1 or FIG. 1-2.

As shown in FIG. 2, the method according to Embodiment 1 of the present invention includes:

S110: A switch (the switch 110 shown in FIG. 1-1) reports a flow table structure to a controller (the controller 120 shown in FIG. 1-1) by using the OpenFlow protocol, where the flow table structure includes match fields and actions that are supported by multiple OpenFlow flow tables and types of the multiple OpenFlow flow tables, there is an intersection among the match fields and actions that are supported by the multiple OpenFlow flow tables, the intersection includes a match field and an action that are used to implement a first service supported by a hardware flow table of the switch, and the types of the multiple OpenFlow flow tables are all a wildcard type.

If a type of a flow table is the wildcard type, when generating a flow entry according to a structure of the flow table, the controller may generate the flow entry by using any one or more match fields supported by the flow table.

For example, table T0 is the wildcard type, and supported match fields include six match fields, that is, in_port, eth_type, src_mac, dst_mac, ip_src, and ip_dst; then, a flow entry generated by the controller according to table T0 may include only match field values corresponding to some of the match fields, for example, the generated flow entry includes values of four match fields, that is, in_port, eth_type, src_mac, and dst_mac, or may include match field values corresponding to all of the match fields of table T0.

Specifically, after establishing a connection to the switch, the controller sends a flow table capability request message (table stats request) to the switch; the switch returns a flow table capability response message (table stats reply) to the controller after receiving the flow table capability request message, where the flow table capability response message carries the flow table structure.

The multiple OpenFlow flow tables may specifically include table T0 (Table 0), table T1 (Table 1), and the like. The match fields may specifically include an ingress port (in_port), an Ethernet type (eth_type), and a source MAC address (src_mac); the actions may specifically include forwarding through a port (output), modifying a source MAC address, modifying a destination MAC address, and the like.

For example, the first service may specifically be a Layer 2 forwarding service based on IP; match fields in_port, eth_type, src_mac, and dst_mac (a destination MAC address) and an action output are required to implement the Layer 2 forwarding service based on IP.

A standard for determining that the hardware flow table of the switch supports the first service may be: one or more hardware flow tables of the switch include the match field and the action that are required to implement the first service. For example, the match fields in_port, eth_type, src_mac, and dst_mac and the action output are required to implement the first service, one hardware flow table of the switch includes the match fields in_port and eth_type, and another hardware flow table includes the match fields src_mac and dst_mac and the action output; then, it may be considered that the hardware flow tables of the switch support the first service. In addition, some actions, for example, an action pop_vlan (assuming that the action pop_vlan is required to implement the first service), required to implement the first service may not need to be configured into the hardware flow tables, but is supported by another hardware resource that is of the switch and that is of a non-hardware flow table type. In this case, provided that each match field required to implement the first service is included in the hardware flow tables of the switch, and that each action that is in actions required to implement the first service and that needs to be written into the hardware flow tables is included in the hardware flow tables of the switch, it may be considered that the hardware flow tables of the switch support the first service. In conclusion, if one or more hardware flow tables of the switch include a match field required to implement the first service and includes an action that is in actions required to implement the first service and that needs to be written into the one or more hardware flow tables, the one or more hardware flow tables may support the first service.

During specific implementation, the match fields of the multiple OpenFlow flow tables reported by the switch may be all match fields supported by the OpenFlow protocol, and the actions of the multiple OpenFlow flow tables reported by the switch may be all actions supported by the OpenFlow protocol. It should be noted that, the intersection may include a match field and an action that are used to implement one or more services supported by the hardware flow table of the switch. If all of the reported multiple OpenFlow flow tables include all the match fields and all the actions supported by the OpenFlow protocol, that is, the intersection includes all the match fields and all the actions supported by the OpenFlow protocol, the match fields and the actions included in the intersection may be used to implement as many services as possible in services supported by the hardware flow table of the switch.

The flow table structure may be that shown in Table 1.

TABLE 1

| Flow table identifier | Flow table type | Match field | Action |
|---|---|---|---|
| T0 | Wildcard type | in_port, vid, eth_type, src_mac, dst_mac, ip_src, ip_dst, src_port, dst_port | Modifying a source MAC Modifying a destination MAC Forwarding through a port |
| T1 | Wildcard type | in_port, vid, eth_type, src_mac, dst_mac, ip_src, ip_dst, src_port, dst_port | Modifying a source MAC Modifying a destination MAC Forwarding through a port |
| . . . | . . . | . . . | . . . |
| T9 | Wildcard type | in_port, vid, eth_type, src_mac, dst_mac, ip_src, ip_dst, src_port, dst_port | Modifying a source MAC Modifying a destination MAC Forwarding through a port |

S120: The switch receives a flow entry sent by the controller by using the OpenFlow protocol, and configures the flow entry into a software flow table, where the flow entry is generated by the controller according to the flow table structure and information about a data packet reported by the switch, the information about the reported data packet includes information about a first data packet of the first service, and the flow entry includes at least one of flow entries matching the first data packet.

It should be noted that, when S110 is executed, the software flow table and the hardware flow table of the switch do not include a flow entry, or include only a default flow entry that cannot match a received data packet.

In S120, each time the switch receives a data packet of which a matched flow entry cannot be found in the hardware flow table or the software flow table, the switch requests, from the controller, a flow entry matching the data packet, configures the flow entry into the software flow table, and configures the flow entry into the hardware flow table according to subsequent steps S130 to S150.

During specific implementation, step S120 includes one or more of the following execution processes:

S120-1: The switch receives one data packet (for example, the first data packet).

S120-2: The switch first searches the hardware flow table of the switch for a flow entry matching the data packet.

If the flow entry is not found, step S120-3 is executed; if the flow entry is found, the data packet is processed according to an action value in the found flow entry.

S120-3: The switch then searches the software flow table of the switch for the flow entry matching the data packet.

If the flow entry is not found, step S120-4 is executed; if the flow entry is found, the data packet is processed according to an action value in the found flow entry.

S120-4: The switch requests, from the controller, the flow entry matching the data packet.

Specifically, the switch sends a Packet In message to the controller, where the Packet In message includes information about the data packet, for example, a number of a port used for receiving the data packet, and for another example, the data packet itself or packet header information of the data packet. When receiving the Packet In message, the controller generates, according to the flow table structure and the information about the data packet (for example, an Ethernet type, a source MAC address, and a destination MAC address in the packet header information of the data packet, or the number of the port used for receiving the data packet), the flow entry matching the data packet, and sends the generated flow entry to the switch by using a Flow mod message.

S120-5: The switch configures the received flow entry into the software flow table.

When the data packet received in S120-1 is the first data packet, a flow entry matching the first data packet is requested in S120-4; correspondingly, in S120-5, the flow entry matching the first data packet is configured into the software flow table.

There may be one flow entry or two or more flow entries matching the first data packet. For example, for the foregoing Layer 2 forwarding service based on IP, as shown in Table 2-1, only a flow entry of T0 may be generated; or as shown in Table 2-2A and Table 2-2B, a flow entry of T0 and a flow entry of T1 may be generated.

TABLE 2-1

| Table T0 | | | | |
|---|---|---|---|---|
| in_port | eth_type | src_mac | dst_mac | action |
| 2 | 0x800 | 0:0:0:0:0:3 | 0:0:0:0:0:4 | output:2 |

TABLE 2-2A

| Table T0 | |
|---|---|
| in_port | action |
| 2 | goto:1 |

TABLE 2-2B

| Table T1 | | | |
|---|---|---|---|
| eth_type | src_mac | dst_mac | action |
| 0x800 | 0:0:0:0:0:3 | 0:0:0:0:0:4 | output:2 |

It should be noted that, for a data packet, if there are two or more flow entries matching the data packet, as shown in Table 2-2A and Table 2-2B, it is possible that a part of the flow entries (for example, the flow entry shown in Table 2-2A) have been configured into the software flow table. This indicates that flow entries delivered by the controller for another previously reported data packet include the part of the flow entries; then, the controller may not repeatedly deliver the part of the flow entries that has been configured to the switch. Therefore, that the flow entry includes at least one of flow entries matching the first data packet in S120 includes the following situations: when there is one flow entry matching the first data packet, the one flow entry is included in the flow entry sent by the controller to the switch; when there are two or more flow entries matching the first data packet, if a part of the two or more flow entries has been sent by the controller to the switch previously, the controller may send only the other flow entry in the two or more flow entries.

In an example in which flow entries of table T0 and table T1 are generated for the Layer 2 forwarding service based on IP, an example of a software flow table that is configured after multiple data packets of the Layer 2 forwarding service based on IP are reported to the controller in S120 is shown in Table 3-1 and Table 3-2.

TABLE 3-1

| Table T0 | |
|---|---|
| in_port | action |
| 3 | goto:1 |
| 2 | goto:1 |

TABLE 3-2

| Table T1 | | | |
|---|---|---|---|
| eth_type | src_mac | dst_mac | action |
| * | 0:0:0:0:0:5 | * | output:3 |
| 0x800 | 0:0:0:0:0:3 | 0:0:0:0:0:4 | output:2 |
| 0x800 | 0:0:0:0:0:5 | 0:0:0:0:0:6 | output:4 |

All of the multiple OpenFlow flow tables reported in S110 may be used to implement the first service; therefore, in S120, according to processing logic of the controller, no matter a flow entry of which flow table or which flow tables is generated for the first service, the flow entry may be successfully generated.

It should be noted that, the hardware flow table in this embodiment of the present invention refers to a flow table in hardware form, and may specifically be a flow table in a hardware forwarding chip of the switch, for example, an ACL list. The software flow table in this embodiment of the present invention refers to an OpenFlow flow table in software form, and may specifically be an OpenFlow flow table stored in a memory of the switch. Similarly, if a proprietary protocol or another standard protocol is used for implementation, the software flow table is a flow table that complies with a corresponding protocol.

S130: The switch acquires, from the software flow table, a first flow entry matching the first data packet, processes the first data packet according to an action value in the first flow entry, and determines, in a preconfigured service path, a first target service path matching the first flow entry.

The following describes a specific implementation manner with reference to a specific example.

For example, the switch receives the first data packet through port 2; in a header field of the first data packet, the following are specified: an Ethernet type is 0x800, a source mac address is 0:0:0:0:0:3, a destination mac address is 0:0:0:0:0:4, a source ip address is 192.168.0.1, a destination ip address is 192.168.0.2, a source port number is 6633, and a destination port number is 6589.

The switch first finds a flow entry matching the first data packet in table T0. Because the first data packet is received from port 2, a second flow entry in table T0 is matched; further, a flow entry matching the first data packet is found in table T1 according to an action value "goto:1" of the second flow entry in table T0.

Because eth_type (the Ethernet type) of the first data packet is 0x800, the source MAC address is 0:0:0:0:0:3, and the destination MAC address is 0:0:0:0:0:4, a second flow entry in table T1 is matched; the first data packet is forwarded through port 3 according to an action value "output: 3" of the second flow entry in table T1.

During the foregoing implementation, the found first flow entry matching the first data packet of the first service includes the second flow entry in table T0 and the second flow entry in table T1.

After acquiring the flow entry matching the first data packet, the switch determines, in the preconfigured service path, the first target service path matching the first flow entry.

Each preconfigured service path includes a match field and an action that are required to implement a service corresponding to each service path.

Examples of the service paths are shown in Table 4.

TABLE 4

| Service path identifier | Supported service | Supported match field | Supported action |
|---|---|---|---|
| L2_L2_MAC | Service A | Dmac, vid | Output, push_vlan, pop_vlan |
| L2_T3S_IPV4 | Service B and service D | Sip, dip, eth_type, ip_proto, ip_dscp | Output, push_vlan, pop_vlan, set_queue, meter, group |
| L3_T3R_IPV4 | Service C | Sip, dip, eth_type, ip_proto, ip_dscp, vid, dmac | Output, push_vlan, pop_vlan, set_queue, meter, group, set_src_eth, set_dst_mac, push_mpls |
| L2_L1T4S_IPv4IPv6 | Layer 2 forwarding service based on IP | Dmac, smac, vid, pcp, in_port, eth_type | output, push_vlan, pop_vlan, set_queue |

The switch determines, in the service paths, the first target service path matching the first flow entry, where match fields of the determined first target service path include an ingress port (ingress port) match field and a packet header match field in match fields corresponding to match field values of the first flow entry, and an action of the first target service path includes an action corresponding to an action value that is in action values in the first flow entry and that is used to process the first data packet. The ingress port match field is used to match a port number (that is, a number of a port for the switch to receive a data packet) for the received data packet to enter the switch; the packet header match field is used to match a field in a packet header of a received data packet.

As in the foregoing example, there are two first flow entries, and match fields corresponding to included match field values are in_port, eth_type, src_mac, and dst_mac, where in_port is an ingress port match field, match field values corresponding to eth_type, src_mac, and dst_mac are used to match a field in a packet header of the first data packet, and are packet header match fields. Included action values are goto:1 and output:3, where goto:1 is used to indicate that a next table is further searched, and output:3 is used to indicate that the first data packet is forwarded through port 3. As can be seen, only output:3 is an action value used to process the first data packet.

It should be noted that, the first flow entry may not include an ingress port match field value; correspondingly, the match fields of the first target service path may naturally not include an ingress port match field.

It should further be noted that, when a service is implemented by using flow entries of multiple flow tables, a matched flow entry may further include a metadata (metadata) match field value and a metadata action that is used to generate data for matching the metadata match field value. As shown in Table 5-1 and Table 5-2, a metadata match field is meta, a metadata match field value is 0x2, and an action used to generate data for matching the metadata match field value is w_meta:0x2.

The metadata match field value is not used to match packet header information of a data packet, and is equivalent to the ingress port match field and the packet header match field. That is, the metadata match field does not belong to the ingress port match field or the packet header match field. The metadata action is not used to process a data packet, that is, is not an action corresponding to an action value used to process the data packet.

TABLE 5-1

Table T0

| in_port | action |
|---|---|
| 2 | w_meta:0x2 goto:1 |

TABLE 5-2

Table T1

| eth_type | meta | src_mac | dst_mac | action |
|---|---|---|---|---|
| 0x800 | 0x2 | 0:0:0:0:0:3 | 0:0:0:0:0:4 | output:2 |

The switch searches each service flow table for a service path in which match fields include in_port, eth_type, src_mac, and dst_mac and in which an action includes output, as the first target service path. As shown in Table 4, match fields of L2_L1T4S_IPv4IPv6 Path include in_port, eth_type, src_mac, and dst_mac, and an action of L2_L1T4S_IPv4IPv6 Path includes output; therefore, L2_L1T4S_IPv4IPv6 Path is determined as the first target service path.

It should be noted that, there may be one first flow entry, or there may be two or more first flow entries.

When there is one first flow entry, each match field corresponding to a match field value included in the first flow entry belongs to the ingress port match field or the packet header match field, and each included action belongs to the action used to process the first data packet. Correspondingly, a service path in which match fields include the match field corresponding to the match field value in the first flow entry and in which an action include the action corresponding to the action value in the first flow entry may be directly determined, in the preconfigured service path, as the first target service path.

When there are two or more first flow entries, the switch may determine the first target service path according to the following method after the first flow entries are found, so as to improve efficiency of the determining.

A1: The switch aggregates the first flow entries to generate a combined flow entry, where match field values included by the combined flow entry are match field values that are in the match field values of the first flow entries and corresponding to the ingress port match field and the packet header match field, and action values included by the combined flow entry are action values that are in the action values of the first flow entries and that are used to process the first data packet.

A2: The switch may determine, in the preconfigured service path, a service path in which match fields include a match field corresponding to the match field value in the combined flow entry and in which an action include an action corresponding to the action value in the combined flow entry, as the first target service path.

S140: The switch determines, according to a preconfigured correspondence between the first target service path and a hardware flow table, the hardware flow table corresponding to the first target service path, where the hardware flow table corresponding to the first target service path supports a service supported by the first target service path.

Specifically, the switch preconfigures a correspondence between service paths and hardware flow tables, and a hardware flow table corresponding to each service path supports a service supported by each service path. For example, each service path includes a match field and an action that are required to implement a service supported by the corresponding service path. As shown in Table 6, a service path L2_L1T4S_IPv4IPv6 is corresponding to hardware flow tables ACL 3 and ACL 5, where ACL 3 and ACL 5 include match fields and actions required to implement the Layer 2 forwarding service that is based on IP and that is supported by L2_L1T4S_IPv4IPv6.

TABLE 6

| Service path identifier | Hardware flow table |
|---|---|
| L2_L2_MAC | ACL 1 |
| L2_T3S_IPV4 | ACL 4 |
| L3_T3R_IPV4 | ACL 4 |
| L2_L1T4S_IPv4IPv6 | ACL 3, and ACL 5 |

L2_L1T4S_IPv4IPv6 Path is the first target service path determined in step S130; according to Table 6, it may be determined that hardware flow tables corresponding to the first target service path are ACL 3 and ACL 5.

It should be noted that, the switch may directly configure a correspondence between service paths and corresponding hardware flow tables; or may configure a correspondence between service paths and another information and a correspondence between the another information and hardware flow tables, thereby indirectly configuring a correspondence between the service paths and the corresponding hardware flow tables.

In order to configure a service path more conveniently, the correspondence between the service paths and the hardware flow tables may be configured in the following manner:

B1: Configure multiple physical flow tables and a correspondence between the physical flow tables and hardware flow tables, where the multiple physical flow tables separately include a supported match field and action, a match field of each physical flow table is included in match fields of a corresponding hardware flow table, and an action that is in actions of each physical flow table and that needs to be written into the hardware flow table is included in an action of the corresponding hardware flow table.

It should be noted that, an action that does not need to be written into a hardware flow table and that is in actions of each physical flow table refers to an action that may be supported by a hardware resource of a non-hardware flow table type in a switch in which the hardware flow table is located.

B2: Configure a correspondence between the service paths and the physical flow tables, where a match field of each service path is included in match fields of all corresponding physical flow tables, and an action of each service path is included in actions of all the corresponding physical flow tables.

In a specific implementation manner, the match field of each service path may be a universal set of the match fields of all the corresponding physical flow tables, and an action of each service path may be a universal set of the actions of all the corresponding physical flow tables.

By using this method, each physical flow table may be used by different service paths; therefore, after the multiple physical flow tables and the correspondence between the physical flow tables and the hardware flow tables are configured by mean of B1, service paths for implementing various services may be conveniently configured by mean of B2.

For example, a preconfigured physical flow table L1 includes match fields eth_src and eth_dst; a preconfigured physical flow table T4S includes match fields ip_src and ip_dst and includes an action output. To implement a service X, the match fields eth_src, eth_dst, ip_src, and ip_dst, and the action output are needed. A service path Y for implementing the service X may be generated according to the physical flow tables L1 and T4S, and a correspondence between the service path Y and the physical flow table L1 and a correspondence between the service path Y and the physical flow table T4S may be configured.

Correspondingly, in step S140, the switch determines, according to a preconfigured correspondence between the first target service path and a physical flow table, a first physical flow table corresponding to the first target service path, and determines, according to a correspondence between the first physical flow table and a hardware flow table, the hardware flow table corresponding to the first physical flow table.

S150: The switch configures a flow entry of the hardware flow table according to the first flow entry.

Specific implementation of S150 may include:

C1: Add a new flow entry to the hardware flow table.

C2: Configure match field values that are in match field values of the first flow entry and corresponding to an ingress port match field and a packet header match field, as match field values of the added flow entry.

C3: Configure an action value other than a first action value as an action value in the added flow entry, where each of the action value and the first action value is in action values of the first flow entry and is in action values used to process the first data packet, and the first action value is an action value that is not included in the hardware flow table and that is corresponding to an action supported by a hardware resource of a non-hardware flow table type in the switch in which the hardware flow table is located.

It should be noted that, the first flow entry may not include the first action value.

If the methods in A1 and A2 are used to determine the first target service path in step S130, in this step, the match field value in the combined flow entry may be directly configured as the match field value in the added flow entry, and another action value, other than the first action value, in the action values of the combined flow entry is configured as the action value in the added flow entry.

As shown in Table 7-1, the switch configures match field values of the match fields in_port, eth_type, src_mac, and dst_mac of the first flow entry into list ACL 5; as shown in Table 7-2, an action value output:3 of the first flow entry is configured into list ACL 3.

TABLE 7-1

| in_port | vid | eth_type | src_mac | dst_mac | action |
|---------|-----|----------|-----------|-----------|--------|
| 2 | 1 | 0x800 | 0:0:0:0:0:3 | 0:0:0:0:0:4 | cond: 1 |

TABLE 7-2

| src_ip | dst_ip | ip_proto | ip_dscp | fhid | action |
|-----------|-----------|----------|---------|------|----------|
| 192.168.0.1 | 192.168.0.2 | 6 | 0 | 1 | output:3 |

If the hardware flow table has more match fields than the match fields corresponding to the match field values of the first flow entry, another match field value in the flow entry may be configured as corresponding information in the header field of the data packet according to the specific implementation, for example, the first flow entry does not include a source IP address, and then the source IP address is extracted from the data packet, and the extracted source IP address is used as a value corresponding to the match field src_ip (the source IP address) in the flow entry; or the another match field value in the flow entry may be configured as a wildcard.

According to Embodiment 1 of the present invention, all the multiple OpenFlow flow tables may be used to implement the first service; therefore, according to the processing logic of the controller, no matter a flow entry of which flow table or which flow tables is generated for the first service, the flow entry may be successfully generated and sent. In addition, the first target service path determined by the switch includes a match field and an action that are corresponding to the match field value and the action value of the data packet of the first service; therefore, the first target service path supports the first service. Moreover, because the hardware flow table corresponding to the first target service path supports the service supported by the first target service path, the hardware flow table corresponding to the first target service path is a hardware flow table supporting the first service. Further, the switch may configure, in the hardware flow table, a flow entry used to implement the first service. Therefore, no matter to which controller the switch is connected, the switch can successfully configure, in the hardware flow table, the flow entry used to implement the first service, so as to successfully process the first service, thereby reducing a probability of failure in service processing.

In some cases, the action values of the first flow entry further include an action value that is not included in the hardware flow table and that is corresponding to an action supported by a hardware resource of a non-hardware flow table type in the switch in which the hardware flow table is located, for example, an action value (for example, pop_vlan and push_vlan) used to perform attribute configuration on a port of the switch. Correspondingly, the switch may further configure, according to the action value that is in the first flow entry and that is used to perform attribute configuration on the port of the switch, an attribute of a port specified by an action value of output in the first flow entry (for example, for a pop_vlan service, an attribute of VLAN 1024 of the port is set to untagging).

In Embodiment 1 of the present invention, as shown in FIG. 1-2, the switch (the switch 110 shown in FIG. 1-2) may include an upper layer communications apparatus (the communications apparatus 110-1 shown in FIGS. 1-2) and a lower layer hardware forwarding chip (the hardware forwarding chip 110-2 shown in FIG. 1-2).

Steps S110, S130, and 140 are executed by the communications apparatus.

In S120, the data packet received by the switch is received through a port of the hardware forwarding chip, and the action of searching the hardware flow table is executed by the hardware forwarding chip. When no flow entry matching the received data packet is found in the hardware flow table, the hardware forwarding chip reports the received data packet to the communications apparatus. Specifically, the hardware forwarding chip may report the received data packet through a network adapter channel between the hardware forwarding chip and the communications apparatus. In S120, other actions other than the action of searching the hardware flow table are executed by the communications apparatus.

Specific implementation of S150 may be: the communications apparatus configures a flow entry of the hardware flow table in the hardware forwarding chip according to the first flow entry, which may specifically be: configuring the flow entry by calling an interface that is of the hardware forwarding chip and used to perform configuration on the hardware flow table, where information configured into the hardware flow table is used as a parameter of the interface and is transferred to the hardware forwarding chip, so as to be configured into the hardware flow table.

In a specific implementation manner, the service path preconfigured by the communications apparatus is only used to implement a service supported by the hardware flow table of the hardware forwarding chip connected to the communications apparatus; then, a corresponding hardware flow table may be definitely determined in step S140 for the target service path matched in step S130 by the communications apparatus. By using this implementation manner, when the communications apparatus is used to be connected to different hardware forwarding chips, corresponding service paths and a correspondence between the service paths and hardware flow tables need to be configured according to services supported by hardware flow tables of the different hardware forwarding chips.

In another specific implementation manner, the service path preconfigured by the communications apparatus may be used to implement services supported by hardware flow tables of multiple different hardware forwarding chips. By using this implementation manner, when the communications apparatus is used to be connected to different hardware forwarding chips, connection between the communications apparatus and the different hardware forwarding chips may be more conveniently implemented provided that a correspondence between service paths and hardware flow tables is configured according to the services supported by the hardware flow tables of the different hardware forwarding chips.

In Embodiment 1 of the present invention, the intersection in S110 may further include a match field and an action that are used to implement a second service that is not supported by the hardware flow table of the switch, the information about the data packet reported in step S120 may further include information about a second data packet of the second service, and the flow entry sent by the controller in S120 may further include at least one of flow entries matching the second data packet.

Correspondingly, the method may further include: acquiring, by the switch from the software flow table, a second flow entry matching the second data packet, and processing the second data packet according to an action of the second flow entry. By using this method, although the hardware flow table of the switch does not support the second service, the switch may process a data packet of the second service in a manner of searching the software flow table.

After the acquiring a second flow entry, the method may further include: determining, by the switch in the preconfigured service path, a second target service path matching the second flow entry, where match fields of the determined second target service path include an ingress port match field and a packet header match field in match fields corresponding to match field values of the second flow entry, and an action of the second target service path includes an action corresponding to an action value that is in action values in the second flow entry and that is used to process the second data packet.

For the foregoing second specific implementation manner, because the second data packet is corresponding to the second service, and the hardware flow table of the switch does not support the second service, the second target service path does not have a corresponding hardware flow table. Therefore, a correspondence between the second target service path and a hardware flow table cannot be configured. Correspondingly, in this case, the hardware flow table corresponding to the second target service path cannot be found.

For this case, in order to improve efficiency of processing the data packet corresponding to the second service subsequently, in Embodiment 1 of the present invention, the method may further include:

D1: The switch configures, according to the second flow entry, a service flow entry of a service flow table corresponding to the second target service path, where the service flow table is an exact match table, and match fields of the service flow table are all match fields of the second target service path; configures a first match field value in the service flow entry as a corresponding match field value in the second flow entry; configures a second match field value in the service flow entry as a corresponding header field value in a packet header of the second data packet; and configures an action value in the service flow entry as an action value in the second flow entry, where a match field corresponding to the first match field value belongs to a match field corresponding to the match field value in the second flow entry, and a match field corresponding to the second match field value does not belong to a match field corresponding to a match field value in the second flow entry.

D2: The switch searches, when receiving a subsequent data packet of the second service later, the service flow table for a service flow entry matching the subsequent data packet, and processes the subsequent data packet according to an action of the found service flow entry.

That the service flow table is an exact match table means that: each match field in the service flow entry of the service flow table has a corresponding match field value rather than a wildcard, so quantities of match field values included in flow entries of the service flow table are the same. Therefore, a table may be searched by using a hash algorithm, so as to improve efficiency of searching the table.

A specific implementation manner may be that: the switch executes S120-2 (the data packet in S120-2 is specifically the subsequent data packet) after receiving the subsequent data packet; if no flow entry is found, the service flow table is searched for a flow entry matching the subsequent data packet; if no flow entry is found, step S120-3 is executed; if the flow entry is found, the subsequent data packet is processed according to an action value in the found flow entry. In addition, when a data packet of another service is received by the switch, the data packet may also be processed in this specific implementation manner.

In addition, if each flow entry delivered by the controller according to each data packet includes all flow entries matching the data packet, the switch may also determine, in the preconfigured service path by directly using all received flow entries matching a data packet, a service path matching the data packet. Two specific implementation manners are as follows:

Specific implementation manner 1: A message (for example, a Flow mod message) that carries a flow entry and that is sent by the controller to the switch further includes identification information, where the identification information is used to identify all flow entries corresponding to a same data packet, and may specifically be an identifier of a data packet corresponding to the carried flow entry. Correspondingly, the switch identifies, among flow entries received from the controller and according to the identification information, all flow entries corresponding to a same data packet, for example, identifies all flow entries corresponding to data packet A, and identifies all flow entries corresponding to data packet B; and determines, in the preconfigured service path, a service path matching the data packet.

Specific implementation manner 2: The controller adds, to different messages, all flow entries matching different data packets, for example, adds, to Flow mod message 1, all flow entries matching data packet A, and adds, to Flow mod message 2, all flow entries matching data packet B. Correspondingly, the switch acquires, from a message, all flow entries corresponding to a data packet, and determines, in the preconfigured service path, a service path matching the data packet.

For a manner of determining a matched service path by directly using a received flow entry, reference is made to the manner of determining the matched first target service path by using the first flow entry in the foregoing step 130; for a manner of determining a corresponding hardware flow table and configuring a flow entry of the hardware flow table after a matched service path is determined, reference is made to the foregoing steps 140 to 150, which are not described again.

Figures 1, 3:
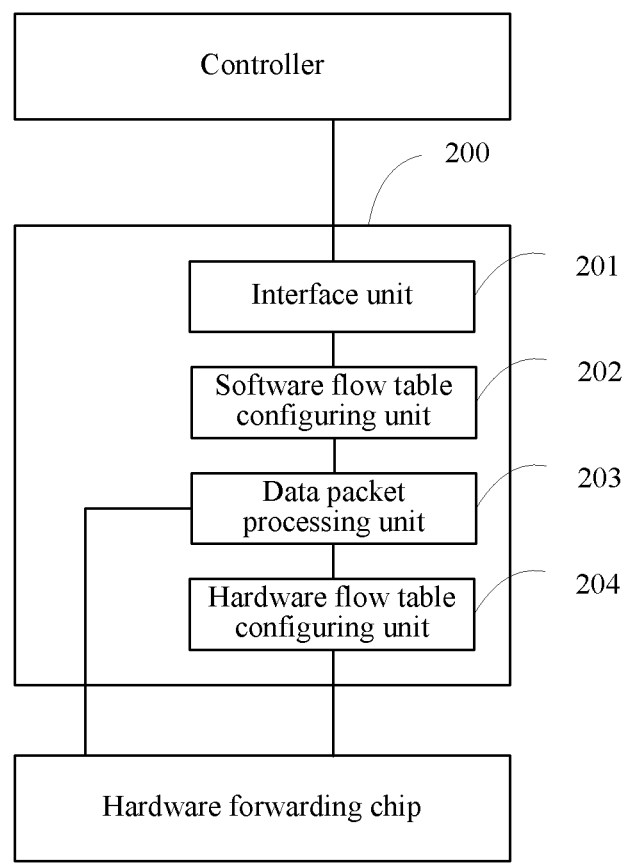
Figures 2, 3:
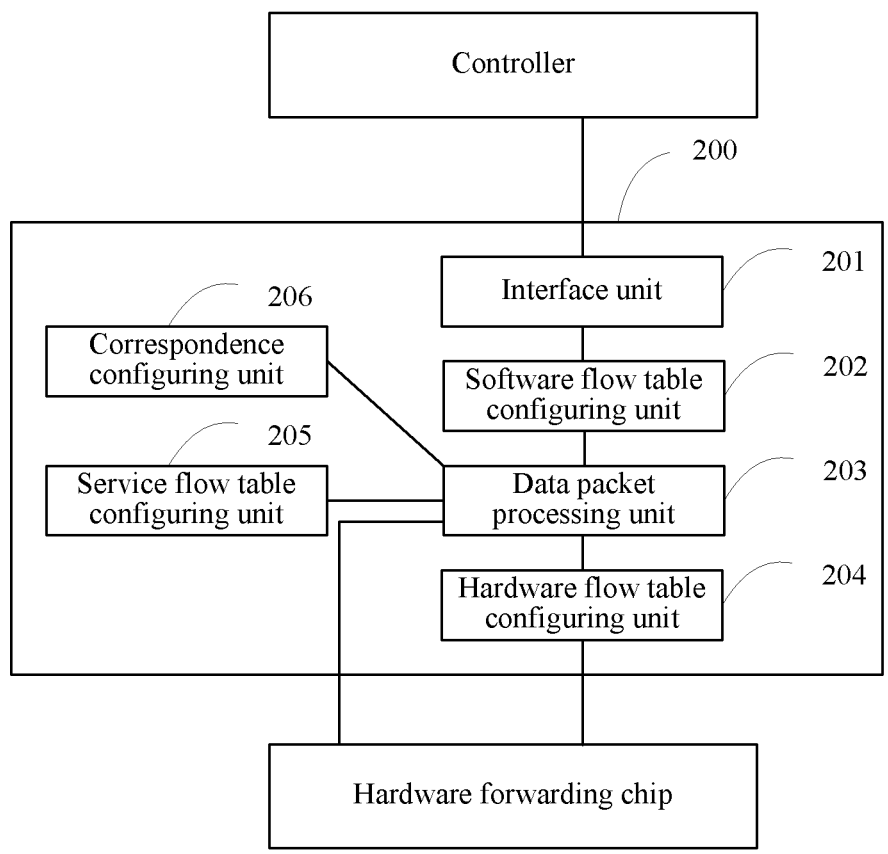

Referring to FIG. 3-1, Embodiment 2 of the present invention provides a communications apparatus 200. The communications apparatus is connected to a hardware forwarding chip, communicates with a controller by using the OpenFlow protocol, and includes an interface unit 201, a software flow table configuring unit 202, a data packet processing unit 203, and a hardware flow table configuring unit 204.

The interface unit 201 is configured to report a flow table structure to the controller, where the flow table structure includes match fields and actions that are supported by multiple OpenFlow flow tables and types of the multiple OpenFlow flow tables, there is an intersection among the match fields and actions that are supported by the multiple OpenFlow flow tables, the intersection includes a match field and an action that are used to implement a first service supported by a hardware flow table of the hardware forwarding chip, and the types of the multiple OpenFlow flow tables are all a wildcard type; and further configured to report information about a data packet to the controller and receive a flow entry sent by the controller, where the flow entry is generated by the controller according to the flow table structure and the information about the data packet, the information about the data packet includes information about a first data packet of the first service, and the flow entry includes at least one of flow entries matching the first data packet.

The match fields of the multiple OpenFlow flow tables may be all match fields supported by the OpenFlow protocol, and the actions of the multiple OpenFlow flow tables may be all actions supported by the OpenFlow protocol.

The software flow table configuring unit 202 is configured to configure the flow entry into a software flow table.

The data packet processing unit is configured to acquire, from the software flow table, a first flow entry matching the first data packet, process the first data packet according to an action value in the first flow entry, and determine, in a preconfigured service path, a first target service path matching the first flow entry, where match fields of the determined first target service path include an ingress port match field and a packet header match field in match fields corresponding to match field values of the first flow entry, an action of the first target service path includes an action corresponding to an action value that is in action values in the first flow entry and that is used to process the first data packet; and the data packet processing unit is configured to determine, according to a preconfigured correspondence between the first target service path and a first hardware flow table, the first hardware flow table corresponding to the first target service path, where the first hardware flow table corresponding to the first target service path supports a service supported by the first target service path. It should be noted that, the first data packet processed by the data packet processing unit 203 is generally reported by the hardware forwarding chip to the data packet processing unit. Specifically, after receiving the first data packet, the hardware forwarding chip first searches the hardware flow table for a flow entry matching the first data packet, and reports the first data packet to the data packet processing unit 203 of the communications apparatus when no flow entry is found.

There may be one first flow entry, or there may be two or more first flow entries. Correspondingly, that the data packet processing unit 203 is configured to determine, in a preconfigured service path, a first target service path matching the first flow entry specifically includes: the data packet processing unit 203 is configured to: when there are two or more first flow entries, aggregate the first flow entries to generate a combined flow entry, where match field values included in the combined flow entry are match field values that are in match field values of the first flow entries and that are corresponding to the ingress port match field and the packet header match field, and action values included in the combined flow entry are action values that are in action values of the first flow entries and that are used to process the first data packet; and determine, in the preconfigured service path, one service path in which match fields include match fields corresponding to the match field values of the combined flow entry and in which actions include actions corresponding to the action values of the combined flow entry, as the first target service path; and the data packet processing unit 203 is configured to: when there is one first flow entry, determine, in the preconfigured service path, one service path in which a match field includes a match field corresponding to the match field value in the first flow entry and in which an action includes an action corresponding to the action value in the first flow entry, as the first target service path.

The hardware flow table configuring unit is configured to configure a flow entry of the first hardware flow table according to the first flow entry.

In addition, the intersection may further include a match field and an action that are used to implement a second service that is not supported by the hardware flow table of the hardware forwarding chip; the information about the data packet further includes information about a second data packet of the second service. A flow entry received by the interface unit 201 from the controller further includes at least one of flow entries matching the second data packet; correspondingly, the data packet processing unit 203 may be further configured to process the second data packet according to an action of a second flow entry when acquiring, from the software flow table, the second flow entry matching the second data packet.

In a specific implementation manner, as shown in FIG. 3-2, the communications apparatus may further include a service flow table configuring unit 205.

In this specific implementation manner, the data packet processing unit 203 is further configured to determine, in the preconfigured service path, a second target service path matching the second flow entry, where match fields of the determined second target service path include an ingress port match field and a packet header match field in match fields corresponding to match field values of the second flow entry, and an action of the second target service path includes an action corresponding to an action value that is in action values in the second flow entry and that is used to process the second data packet.

The service flow table configuring unit 205 is configured to: configure, according to the second flow entry, a service flow entry of a service flow table corresponding to the second target service path, where the service flow table is an exact match table, and match fields of the service flow table are all match fields of the second target service path; configure a first match field value in the service flow entry as a corresponding match field value in the first flow entry; configure a second match field value in the service flow entry as a corresponding header field value in a packet header of the second data packet; and configure an action value in the service flow entry as the action value in the second flow entry, where a match field corresponding to the first match field value belongs to a match field corresponding to the match field value in the first flow entry, and a match field corresponding to the second match field value does not belong to a match field corresponding to a match field value in the second flow entry.

Correspondingly, the data packet processing unit 203 is further configured to: search, when receiving a subsequent data packet of the second service later, the service flow table for a service flow entry matching the subsequent data packet, and process the subsequent data packet according to an action of the found service flow entry.

Preferably, as shown in FIG. 3-2, the communications apparatus may further include a correspondence configuring unit 206, where the correspondence configuring unit 206 is configured to configure a correspondence between service paths and corresponding hardware flow tables, and the service paths include the first target service path, which specifically includes: the correspondence configuring unit 206 is configured to configure multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and the correspondence configuring unit 206 is configured to configure a correspondence between the service paths and the physical flow tables, where a match field of each service path is included in match fields of all corresponding physical flow tables, and an action of each service path is included in actions of all the corresponding physical flow tables.

Correspondingly, that the data packet processing unit 203 is configured to determine, according to a preconfigured correspondence between the first target service path and a first hardware flow table, the first hardware flow table corresponding to the first target service path specifically includes: the data packet processing unit 203 is configured to determine a first physical flow table according to a correspondence between the first target service path and the corresponding first physical flow table, and determine the first hardware flow table according to a correspondence between the first physical flow table and the corresponding first hardware flow table.

Functional units described in Embodiment 2 of the present invention may be configured to implement the method executed by the communications apparatus in Embodiment 1.

According to Embodiment 2 of the present invention, all the multiple OpenFlow flow tables may be used to implement the first service; therefore, according to processing logic of the controller, no matter a flow entry of which flow table or which flow tables is generated for the first service, the flow entry may be successfully generated and sent. In addition, the first target service path determined by the communications apparatus includes a match field and an action that are corresponding to the match field value and the action value of the data packet of the first service; therefore, the first target service path supports the first service. Moreover, because the hardware flow table corresponding to the first target service path supports the service supported by the first target service path, the hardware flow table corresponding to the first target service path is a hardware flow table supporting the first service. Further, the communications apparatus may configure, in the hardware flow table, a flow entry used to implement the first service. Therefore, no matter to which controller the communications apparatus is connected, the communications apparatus may successfully configure, in the hardware flow table, the flow entry used to implement the first service, so as to successfully process the first service, thereby reducing a probability of failure in service processing.

Figure 4:
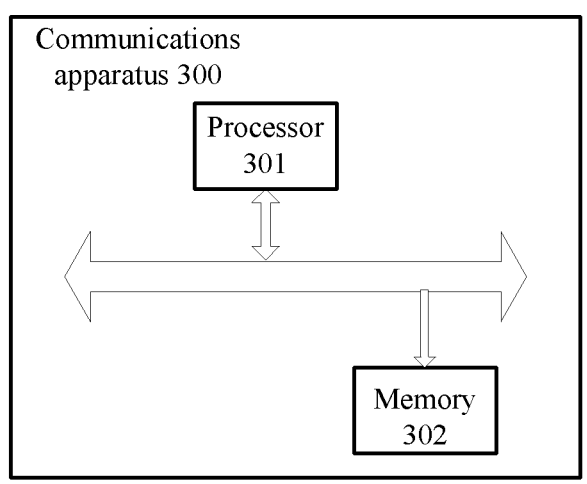
FIG. 4 is a schematic structural diagram of a communications apparatus 300 according to Embodiment 3 of the present invention.

Referring to FIG. 4, Embodiment 3 of the present invention provides a communications apparatus 300 for implementing flow entry configuration, including a processor 301 and a memory 302.

The memory 302 is configured to store a computer operation instruction.

The processor 301 is configured to execute the computer operation instruction stored in the memory 302, so that the communications apparatus implements the following operations:

reporting a flow table structure to a controller by using the OpenFlow protocol, where the flow table structure includes match fields and actions that are supported by multiple OpenFlow flow tables and types of the multiple OpenFlow flow tables, there is an intersection among the match fields and actions that are supported by the multiple OpenFlow flow tables, the intersection includes a match field and an action that are used to implement a first service supported by a hardware flow table of a hardware forwarding chip, the types of the multiple OpenFlow flow tables are all a wildcard type, and the communications apparatus is connected to the hardware forwarding chip;

receiving a flow entry that is generated according to the flow table structure and sent by the controller by using the OpenFlow protocol, and configuring the flow entry into a software flow table, where the flow entry is generated by the controller according to the flow table structure and information about a data packet reported by the communications apparatus, the information about the data packet includes information about a first data packet of the first service, and the flow entry includes at least one of flow entries matching the first data packet;

acquiring, from the software flow table, a first flow entry matching the first data packet; processing the first data packet according to an action value in the first flow entry; and determining, in a preconfigured service path, a first target service path matching the first flow entry, where match fields of the determined first target service path include an ingress port match field and a packet header match field in match fields corresponding to match field values of the first flow entry, and an action of the first target service path includes an action corresponding to an action value that is in action values in the first flow entry and that is used to process the first data packet;

determining, according to a preconfigured correspondence between the first target service path and a first hardware flow table, the first hardware flow table corresponding to the first target service path, where the first hardware flow table corresponding to the first target service path supports a service supported by the first target service path; and configuring a flow entry of the first hardware flow table according to the first flow entry.

In a specific implementation manner, the processor 301 may execute the computer operation instruction, so that, specifically, the match fields of the multiple OpenFlow flow tables reported by the communications apparatus may be all match fields supported by the OpenFlow protocol, and the actions of the reported multiple OpenFlow flow tables may be all actions supported by the OpenFlow protocol.

There may be one first flow entry, or there may be two or more first flow entries. Correspondingly, the processor 301 may execute the computer operation instruction, so that the communications apparatus specifically implements the following operations:

when there are two or more first flow entries, aggregating the first flow entries to generate a combined flow entry, where match field values included in the combined flow entry are match field values that are in match field values of the first flow entries and that are corresponding to the ingress port match field and the packet header match field, action values included in the combined flow entry are action values that are in action values of the first flow entries and that are used to process the first data packet; and determining, in the preconfigured service path, one service path in which match fields include match fields corresponding to the match field values of the combined flow entry and in which actions include actions corresponding to the action values of the combined flow entry, as the first target service path; and when there is one first flow entry, determining, in the preconfigured service path, one service path in which a match field includes a match field corresponding to a match field value in the first flow entry and in which an action includes an action corresponding to the action value in the first flow entry, as the first target service path.

During specific implementation, the intersection may further include a match field and an action that are used to implement a second service that is not supported by the hardware flow table of the hardware forwarding chip; the information about the data packet further includes information about a second data packet of the second service; a flow entry received from the controller further includes at least one of flow entries matching the second data packet; and correspondingly, the processor 301 executes the computer operation instruction, so that the communications apparatus further implements the following operations: acquiring, from the software flow table, a second flow entry matching the second data packet, and processing the second data packet according to an action of the second flow entry.

Further, the processor 301 may further execute the computer operation instruction, so that the communications apparatus further implements the following operations:

determining, in the preconfigured service path, a second target service path matching the second flow entry, where match fields of the determined second target service path include an ingress port match field and a packet header match field in match fields corresponding to match field values of the second flow entry, and an action of the second target service path includes an action corresponding to an action value that is in action values in the second flow entry and that is used to process the second data packet;

configuring, according to the second flow entry, a service flow entry of a service flow table corresponding to the second target service path, where the service flow table is an exact match table, and match fields of the service flow table are all match fields of the second target service path; configuring a first match field value in the service flow entry as a corresponding match field value in the first flow entry; configuring a second match field value in the service flow entry as a corresponding header field value in a packet header of the second data packet; and configuring an action value in the service flow entry as the action value in the second flow entry, where a match field corresponding to the first match field value belongs to a match field corresponding to the match field value in the first flow entry, and a match field corresponding to the second match field value does not belong to a match field corresponding to a match field value in the second flow entry; and searching, when receiving a subsequent data packet of the second service later, the service flow table for a service flow entry matching the subsequent data packet, and processing the subsequent data packet according to an action of the found service flow entry;

Preferably, the processor 301 further executes the computer operation instruction, so that the communications apparatus further implements the following operations: configuring a correspondence between service paths and corresponding hardware flow tables, where the service paths include the first target service path, specifically including:

configuring multiple physical flow tables and a correspondence between the physical flow tables and hardware flow tables, where the multiple physical flow tables separately include a supported match field and action, a match field of each physical flow table is included in match fields of a corresponding hardware flow table, and an action that is in an action of each physical flow table and that needs to be written into the hardware flow table is included in an action of the corresponding hardware flow table; and configuring a correspondence between the service paths and the physical flow tables, where a match field of each service path is included in match fields of all corresponding physical flow tables, and an action of each service path is included in actions of all the corresponding physical flow tables.

Correspondingly, that the processor 301 executes the computer operation instruction, so that the communications apparatus determines, according to a preconfigured correspondence between the first target service path and a first hardware flow table, the first hardware flow table corresponding to the first target service path specifically includes: the processor 301 executes the computer operation instruction, so that the communications apparatus specifically determines a first physical flow table according to a correspondence between the first target service path and the corresponding first physical flow table, and determines the first hardware flow table according to a correspondence between the first physical flow table and the corresponding first hardware flow table.

The processor 301 described in Embodiment 3 of the present invention executes the computer operation instruction, so that the communications apparatus implements the method executed by the communications apparatus in Embodiment 1.

According to Embodiment 3 of the present invention, all the multiple OpenFlow flow tables may be used to implement the first service; therefore, according to processing logic of the controller, no matter a flow entry of which flow table or which flow tables is generated for the first service, the flow entry may be successfully generated and sent. In addition, the first target service path determined by the communications apparatus includes a match field and an action that are corresponding to the match field value and the action value of the data packet of the first service; therefore, the first target service path supports the first service. Moreover, because the hardware flow table corresponding to the first target service path supports the service supported by the first target service path, the hardware flow table corresponding to the first target service path is a hardware flow table supporting the first service. Further, the communications apparatus may configure, in the hardware flow table, a flow entry used to implement the first service. Therefore, no matter to which controller the communications apparatus is connected, the communications apparatus may successfully configure, in the hardware flow table, the flow entry used to implement the first service, so as to successfully process the first service, thereby reducing a probability of failure in service processing.

Figure 5:
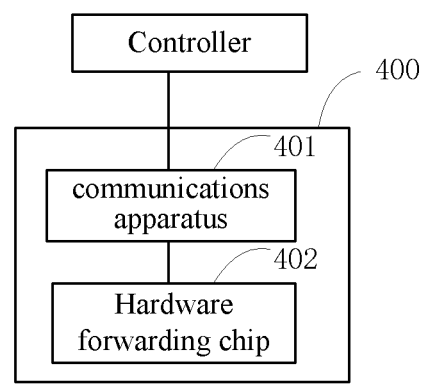
FIG. 5 is a schematic structural diagram of a switch 400 according to Embodiment 4 of the present invention.

Referring to FIG. 5, Embodiment 4 of the present invention provides a switch 400, including a communications apparatus 401 and a hardware forwarding chip 402, where the communications apparatus 401 is connected to the hardware forwarding chip 402, the communications apparatus 401 communicates with a controller by using the OpenFlow protocol, and the communications apparatus 401 is specifically the communications apparatus 200 provided by Embodiment 2 or the communications apparatus 300 provided by Embodiment 3.

Figure 6:
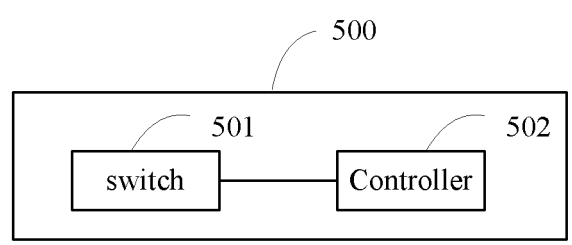
FIG. 6 is a schematic structural diagram of a communications system 500 according to Embodiment 5 of the present invention.

Referring to FIG. 6, Embodiment 5 of the present invention provides a communications system 500, including a switch 501 and a controller 502, where the switch 501 communicates with the controller 502 by using the OpenFlow protocol, and the switch 501 is specifically the switch 400 provided by Embodiment 4.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method performed by a switch in a software defined networking (SDN) system, comprising:
   reporting information about a first data packet of a first service to a controller coupled to the switch in the SDN system;
   receiving a first flow entry of the first service from the controller, wherein the first flow entry is generated by the controller based on the information about the first data packet and a flow table structure, wherein the flow table structure is used to generate, for different hardware flow tables corresponding to a plurality of switches, the first flow entry for processing data packets of the first service, wherein the flow table structure comprises a plurality of match fields and a plurality of actions, wherein the plurality of match fields comprise a match field of the first service, and wherein the plurality of actions comprise an action for processing data packets of the first service;
   determining, from a plurality of preconfigured service paths, a first target service path associated with the first flow entry, wherein a match field of the first target service path comprises the match field of the first service, and an action of the first target service path comprises the action for processing data packets of the first service; and
   configuring, according to the first flow entry of the first service, a flow entry of a target hardware flow table corresponding to the first target service path, wherein the target hardware flow table is a hardware flow table of a hardware forwarding chip in the switch.

2. The method of claim 1, wherein the switch communicates with the controller by using an OpenFlow protocol, and the flow table structure are supported by multiple flow tables.

3. The method of claim 1, wherein the determining the first target service path comprises:
   configuring the first flow entry into a software flow table of the switch;
   acquiring, from the configured software flow table, a plurality of target flow entries matching the first data packet; and
   determining, from a plurality of preconfigured service paths, the first target service path corresponding to the plurality of target flow entries, wherein match fields of the first target service path comprise an ingress port match field and a packet header match field corresponding to the plurality of target flow entries, and wherein the action for processing data packets of the first service is indicated by actions of the plurality of target flow entries.

4. The method of claim 1, further comprising:
   reporting information about a second data packet of a second service to the controller, wherein the second service is not supported by the hardware flow tables;
   receiving a second flow entry of the second service that is delivered by the controller based on the information about the second data packet and the flow table structure; and
   configuring the second flow entry of the second service into the software flow table.

5. The method of claim 4, further comprising:
   acquiring, from configured the software flow table, a second target flow entry associated with the second data packet;
   determining, from the plurality of preconfigured service paths, a second target service path associated with the second target flow entry, wherein match fields of the second target service path comprise an ingress port match field and a packet header match field corresponding to match field values of the second target flow entry, and an action of the second target service path for processing data packets of the second service corresponds to an action indicated by the second target flow entry;

configuring, based on the second target flow entry, a service flow entry of a service flow table corresponding to the second target service path, wherein match fields of the service flow table comprise match fields of the second target service path, and wherein an action value in the service flow entry corresponds to the action value in the second target flow entry; and processing the second data packet according to an action in the configured service flow entry of the service flow table corresponding to the second target service path.

6. The method according to claim 1, before the configuring a flow entry of a target hardware flow table, further comprising:

configuring a physical flow table and a correspondence between the physical flow table and the target hardware flow table, wherein a match field of the physical flow table is comprised in match fields of the target hardware flow table, and wherein an action of the physical flow table is comprised in actions of the target hardware flow table; and configuring a correspondence between the first target service path and the physical flow table, wherein a match field of the service path is comprised in match fields of the physical flow table, and an action of the first target service path is comprised in actions of the physical flow table;

determining the physical flow table based on the correspondence between the first target service path and the physical flow table; and determining the target hardware flow table based on the correspondence between the physical flow table and the target hardware flow table.

7. The method of claim 1, further comprising reporting the flow table structure to the controller before the reporting the information about the first data packet.

8. The method according to claim 1, wherein the first flow entry is generated by the controller based on one or more match fields of the flow table structure.

9. A switch, comprising:

a hardware forwarding chip configured to forward a data packet; and a communications apparatus coupled to the hardware forwarding chip and configured to:

report information about a first data packet of a first service to a controller coupled to the switch in the SDN system;

receive a first flow entry of the first service from the controller, wherein the first flow entry is generated by the controller based on the information about the first data packet and a flow table structure, wherein the flow table structure is used to generate, for different hardware flow tables corresponding to a plurality of switches, the first flow entry for processing data packets of the first service, wherein the flow table structure comprises a plurality of match fields and a plurality of actions, wherein the plurality of match fields comprise a match field of the first service, and wherein the plurality of actions comprise an action for processing data packets of the first service;

determine, from a plurality of preconfigured service paths, a first target service path associated with the first flow entry, wherein a match field of the first target service path comprises the match field of the first service, and an action of the first target service path comprises the action for processing data packets of the first service; and configure, according to the first flow entry of the first service, a flow entry of a target hardware flow table corresponding to the first target service path, wherein the target hardware flow table is a hardware flow table of a hardware forwarding chip in the switch.

10. The switch of claim 9, wherein the communications apparatus communicates with the controller by using an OpenFlow protocol, and the flow table structure are supported by multiple flow tables.

11. The switch of claim 9, wherein in the determining step, the communications apparatus is configured to:

configure the first flow entry into a software flow table of the switch;

acquire, from the configured software flow table, a plurality of target flow entries matching the first data packet; and determine, from a plurality of preconfigured service paths, the first target service path corresponding to the plurality of target flow entries, wherein match fields of the first target service path comprise an ingress port match field and a packet header match field corresponding to the plurality of target flow entries, and wherein the action for processing data packets of the first service is indicated by actions of the plurality of target flow entries.

12. The switch of claim 9, wherein the communications apparatus is further configured to:

report information about a second data packet of a second service to the controller, wherein the second service is not supported by the hardware flow table of the hardware forwarding chip;

receive a second flow entry of the second service that is delivered by the controller based on the information about the second data packet and the flow table structure; and configure the second flow entry of the second service into the software flow table.

13. The switch of claim 12, wherein the communications apparatus is further configured to:

acquire, from the configured software flow table, a second target flow entry associated with the second data packet;

determine, from the plurality of preconfigured service paths, a second target service path associated with the second target flow entry, wherein match fields of the second target service path comprise an ingress port match field and a packet header match field corresponding to match field values of the second target flow entry, and an action of the second target service path for processing data packets of the second service corresponds to an action indicated by the second target flow entry;

configure, based on the second target flow entry, a service flow entry of a service flow table corresponding to the second target service path, wherein match fields of the service flow table comprise match fields of the second target service path, and wherein an action value in the service flow entry corresponds to the action value in the second target flow entry; and process the second data packet according to an action in the configured service flow entry of the service flow table corresponding to the second target service path.

14. The switch of claim 9, wherein the communications apparatus is further configured to:
configure a physical flow table and a correspondence between the physical flow table and the target hardware flow table, wherein a match field of the physical flow table is comprised in match fields of the target hardware flow table, and wherein an action of the physical flow table is comprised in actions of the target hardware flow table;
configure a correspondence between the first target service path and the physical flow table, wherein a match field of the service path is comprised in match fields of the physical flow table, and an action of the first target service path is comprised in actions of the physical flow table;
determine the physical flow table based on the correspondence between the first target service path and the physical flow table; and
determine the target hardware flow table based on the correspondence between the physical flow table and the target hardware flow table.

15. A non-transitory computer readable storage medium comprising one or more computer-executable instructions, wherein the one or more computer-executable instructions, when executed by one or more processors of a switch, cause the switch to:
report information about a first data packet of a first service to a controller coupled to the switch in a software defined networking (SDN) system;
receive a first flow entry of the first service from the controller, wherein the first flow entry is generated by the controller based on the information about the first data packet and a flow table structure, wherein the flow table structure is used to generate, for different hardware flow tables corresponding to a plurality of switches, the first flow entry for processing data packets of the first service, wherein the flow table structure comprises a plurality of match fields and a plurality of actions, wherein the plurality of match fields comprise a match field of the first service, and wherein the plurality of actions comprise an action for processing data packets of the first service;
determine, from a plurality of preconfigured service paths, a first target service path associated with the first flow entry, wherein a match field of the first target service path comprises the match field of the first service, and an action of the first target service path comprises the action for processing data packets of the first service; and
configure, according to the first flow entry of the first service, a flow entry of a target hardware flow table corresponding to the first target service path, wherein the target hardware flow table is a hardware flow table of a hardware forwarding chip in the switch.

16. The non-transitory computer readable storage medium of claim 15, wherein the one or more computer-executable instructions, when executed by the one or more processors of the switch, further cause the switch to communicate with the controller by using an OpenFlow protocol, wherein the flow table structure is supported by multiple flow tables.

17. The non-transitory computer readable storage medium of claim 15, wherein the one or more computer-executable instructions, when executed by the one or more processors of the switch, further cause the switch to:
configure the first flow entry into a software flow table of the switch;
acquire, from the configured software flow table, a plurality of target flow entries matching the first data packet; and
determine, from a plurality of preconfigured service paths, the first target service path corresponding to the plurality of target flow entries, wherein match fields of the first target service path comprise an ingress port match field and a packet header match field corresponding to the plurality of target flow entries, and wherein the action for processing data packets of the first service is indicated by actions of the plurality of target flow entries.

18. The non-transitory computer readable storage medium of claim 15, wherein the one or more computer-executable instructions, when executed by the one or more processors of the switch, further cause the switch to:
report information about a second data packet of a second service to the controller, wherein the second service is not supported by the hardware flow table of the hardware forwarding chip;
receive a second flow entry of the second service that is delivered by the controller based on the information about the second data packet and the flow table structure; and
configure the second flow entry of the second service into the software flow table.

19. The non-transitory computer readable storage medium of claim 15, wherein the one or more computer-executable instructions, when executed by the one or more processors of the switch, further cause the switch to:
acquire, from the configured software flow table, a second target flow entry associated with the second data packet;
determine, from the plurality of preconfigured service paths, a second target service path associated with the second target flow entry, wherein match fields of the second target service path comprise an ingress port match field and a packet header match field corresponding to match field values of the second target flow entry, and an action of the second target service path for processing data packets of the second service corresponds to an action indicated by the second target flow entry;
configure, based on the second target flow entry, a service flow entry of a service flow table corresponding to the second target service path, wherein match fields of the service flow table comprise match fields of the second target service path, and wherein an action value in the service flow entry corresponds to the action value in the second target flow entry; and
process the second data packet according to an action in the configured service flow entry of the service flow table corresponding to the second target service path.

20. The non-transitory computer readable storage medium of claim 15, wherein the one or more computer-executable instructions, when executed by the one or more processors of the switch, further cause the switch to:
configure a physical flow table and a correspondence between the physical flow table and the target hardware flow table, wherein a match field of the physical flow table is comprised in match fields of the target hardware flow table, and wherein an action of the physical flow table is comprised in actions of the target hardware flow table;

configure a correspondence between the first target service path and the physical flow table, wherein a match field of the service path is comprised in match fields of the physical flow table, and an action of the first target service path is comprised in actions of the physical flow table;

determine the physical flow table based on the correspondence between the first target service path and the physical flow table; and determine the target hardware flow table based on the correspondence between the physical flow table and the target hardware flow table.

* * * * *